(12) United States Patent
Hori et al.

(10) Patent No.: US 7,931,315 B2
(45) Date of Patent: Apr. 26, 2011

(54) BUMPER BEAM FOR AUTOMOBILE

(75) Inventors: Naoki Hori, Tochigi-ken (JP); Yusuke Yamazaki, Tochigi-ken (JP)

(73) Assignee: Marujun Co., Ltd., Gifu-Ken (JP)

( * ) Notice: Subject to any disclaimer, the term of this patent is extended or adjusted under 35 U.S.C. 154(b) by 277 days.

(21) Appl. No.: 11/975,296

(22) Filed: Oct. 18, 2007

(65) Prior Publication Data

US 2008/0217934 A1 Sep. 11, 2008

(30) Foreign Application Priority Data

Mar. 9, 2007 (JP) ................................. 2007-059998

(51) Int. Cl.
*B60R 19/04* (2006.01)
(52) U.S. Cl. ....................................................... 293/102
(58) Field of Classification Search .................. 293/102, 293/120–122, 132–133, 142–144, 146
See application file for complete search history.

(56) References Cited

U.S. PATENT DOCUMENTS

| | | | |
|---|---|---|---|
| 5,080,410 A | | 1/1992 | Stewart et al. |
| 5,306,058 A | | 4/1994 | Sturrus et al. |
| 5,314,229 A | * | 5/1994 | Matuzawa et al. ........ 296/187.09 |
| 5,462,325 A | * | 10/1995 | Masuda et al. ................. 293/102 |
| 5,997,058 A | * | 12/1999 | Pedersen ........................ 293/102 |
| 6,000,738 A | * | 12/1999 | Stewart et al. ................. 293/102 |
| 6,082,792 A | * | 7/2000 | Evans et al. ................... 293/133 |
| 6,343,820 B1 | * | 2/2002 | Pedersen ........................ 293/102 |
| 6,352,297 B1 | * | 3/2002 | Sundgren et al. .............. 293/102 |
| 6,360,441 B1 | * | 3/2002 | Himsl et al. ................... 29/897.2 |
| 6,684,505 B2 | * | 2/2004 | Sundgren et al. ............. 29/897.2 |
| 6,685,244 B2 | * | 2/2004 | McCoy et al. ................. 293/102 |
| 6,692,065 B2 | | 2/2004 | Yamamoto et al. |
| 6,813,920 B2 | * | 11/2004 | Yoshida et al. ................. 72/166 |
| 6,851,731 B2 | * | 2/2005 | Janssen ........................ 293/102 |
| 6,923,482 B2 | * | 8/2005 | Cumming et al. ............. 293/102 |
| D516,970 S | * | 3/2006 | Hess ............................ D12/169 |
| 7,007,989 B2 | * | 3/2006 | Yoon ............................ 293/120 |
| 7,025,396 B2 | * | 4/2006 | Omura et al. ................. 293/102 |
| 7,210,717 B1 | * | 5/2007 | Baccouche et al. ........... 293/102 |
| RE40,736 E | * | 6/2009 | Heatherington et al. ..... 293/102 |
| 7,665,777 B2 | * | 2/2010 | Mellis et al. .................. 293/102 |

FOREIGN PATENT DOCUMENTS

| | | |
|---|---|---|
| DE | 198 49 358 | 5/2000 |
| EP | 1 262 374 | 12/2002 |
| JP | 7-069146 | 3/1995 |
| JP | 09-030345 | 2/1997 |
| JP | 11-170934 | 6/1999 |
| JP | 2001-199292 | 7/2001 |
| JP | 2001-260774 | 9/2001 |
| JP | 2002-087186 | 3/2002 |
| JP | 2002-145123 | 5/2002 |

(Continued)

*Primary Examiner* — Hilary Gutman
(74) *Attorney, Agent, or Firm* — Jordan and Hamburg LLP

(57) ABSTRACT

A bumper beam includes two tubular bodies formed by tube hydroforming that extend left and right. The tubular bodies are joined to each other in a parallel state. The tubular bodies each have a rectangular vertical cross-section shape including top and bottom and front and rear sides. The tubular bodies are disposed in a line from top to bottom, and opposing surfaces thereof are joined together across the entire length in the longitudinal direction.

13 Claims, 31 Drawing Sheets

FOREIGN PATENT DOCUMENTS

| | | |
|---|---|---|
| JP | 2003-053446 | 2/2003 |
| JP | 2003-104140 | 4/2003 |
| JP | 2003-291755 | 10/2003 |
| JP | 2004-203211 | 7/2004 |
| WO | WO-2005/080141 | 9/2005 |

* cited by examiner

RELATED ART

RELATED ART

RELATED ART

BUMPER BEAM FOR AUTOMOBILE

BACKGROUND OF THE INVENTION

The present invention relates to a bumper beam for automobile that protects an automobile from impact on collision.

One conventional bumper beam for automobile is formed by roll casting. (See patent documents 1, 2 and 3, for example.) FIG. 41 shows a vertical cross-section view of a bumper beam 11 disclosed in patent document 1. The bumper beam 11 comprises a plate material curved by roll-forming, and ends 12 of this plate material are welded to intermediate positions of the plate material. This bumper beam 11 is provided with a rib 15 extending between a front section 13 and a rear section 14. FIG. 42 shows a vertical cross-section view of a bumper beam 21 disclosed in patent document 2. This bumper beam 21 comprises a plate material curved by roll-forming, and end sections 22, 22 are bent and joined so as to be entwined together. FIGS. 43 and 44 show vertical cross-section views of a bumper beam 31 disclosed in patent document 3. This bumper beam 31 comprises a plate material curved by roll-forming, ends 32 of which are inserted into a hole 33 opened in an intermediate position on the plate material and thus joined thereto.

Another bumper beam for automobiles used aluminum extruded materials. For example, as shown in FIG. 45, the bumper beam 41 has a rectangular vertical cross-section with a reinforcement member 42 extending across the center as a cross beam.

Another bumper beam was formed by tube hydro-forming (for example, see Patent Document 4). FIG. 46 is a plan view of this bumper beam 51. The bumper beam 51 is made from a single tubular body. The bumper beam 51 comprises attachment sections 52, 52 protruding toward the body side integrally formed by tube hydro-forming.

Patent document 1: Japanese Patent Application Publication H11-170934
Patent document 2: Japanese Patent Application Publication 2001-260774
Patent document 3: Japanese Patent Application Publication 2002-87186
Patent document 4: Japanese Patent Application Publication. 2003-104140

However, the conventional roll-formed bumper beams 11, 21, 31 or bumper beam 41 that used extruded material, because of their manufacturing method, have a set vertical cross-section shape in the longitudinal direction, and thus have a low degree of freedom of shape. Also, because the bumper beam 51 made by tube hydro-forming comprises a single tubular body, in order to ensure requisite strength, the vertical cross-section shape had to be made large, and reducing size was difficult.

The present invention was conceived in order to resolve the drawbacks of conventional bumper beams, and its object is to provide a bumper beam for automobile that can be made smaller while maintaining a high degree of freedom of shape.

SUMMARY OF THE INVENTION

To achieve the objects, the bumper beam for automobile relating to the present invention has the following constitution.

The bumper beam for automobile in accordance with a first aspect of the invention comprises a plurality of tubular bodies formed by tube hydroforming that extend in the lateral direction, such tubular bodies being joined together in a state parallel to each other. Because the tubular bodies constituting the bumper beam are formed by tube hydroforming, the vertical cross-section shape can be changed in the longitudinal direction, and the line curvature of the front surface, and so forth in the plan view can be changed in the longitudinal direction, thus allowing for a high degree of freedom in terms of shape. Because the bumper beam has a plurality of tubular bodies joined together in a parallel state, the bumper beam has a plurality of loops in the vertical cross-section, which is a constitution that is advantageous in terms of strength and enables size reductions.

According to a second aspect of the invention, in the bumper beam according to the first aspect of the invention, each of the plurality of tubular bodies has a substantially rectangular vertical cross-section shape comprising top and bottom sides and front and rear sides.

According to a third aspect of the invention, in the bumper beam according to the first aspect of the invention, the plurality of tubular bodies are disposed arrayed vertically.

According to a fourth aspect of the invention, in the bumper beam according to the third aspect of the invention, the upper surface of the uppermost tubular body among the plurality of tubular bodies projects upwardly in the center section excluding the two ends in the longitudinal direction.

According to a fifth aspect of the invention, in the bumper beam according to the third aspect of the invention, the lower surface of the bottommost tubular body among the plurality of tubular bodies projects downwardly in the center section excluding the two ends in the longitudinal direction.

According to a sixth aspect of the invention, in the bumper beam according to the first aspect of the invention, the plurality of tubular bodies are disposed arrayed front to rear.

According to a seventh aspect of the invention, in the bumper beam according to the first aspect of the invention, in the plurality of tubular bodies, surfaces that face each other are joined across the entire length in the longitudinal direction.

According to an eighth aspect of the invention, in the bumper beam according to the first aspect of the invention, at least two tubular bodies among the plurality of tubular bodies have mutually different plate thicknesses.

According to a ninth aspect of the invention, in the bumper beam according to the first aspect of the invention, at least two tubular bodies among the plurality of tubular bodies are made from mutually different materials.

According to a tenth aspect of the invention, in the bumper beam according to the third aspect of the invention, two tubular bodies are provided. For the upper of these tubular bodies, the two ends in the longitudinal direction are formed horizontally, and the upper surface of the center section excluding the ends in the longitudinal direction is formed projecting upwardly. For the lower of the two tubular bodies, the ends in the longitudinal direction are formed horizontally so as to join with the upper tubular body.

According to an eleventh aspect of the invention, in the bumper beam according to the tenth aspect of the invention, the lower surface of the lower tubular body is formed horizontally across the entire length in the longitudinal direction.

According to a twelfth aspect of the invention, in the bumper beam according to the eleventh aspect of the invention, for the upper tubular body, the lower surface of the center section excluding the two ends in the longitudinal direction is formed depressed upwardly only to an extent less than the extent to which the upper surface projects upwardly, and for the lower tubular body, the upper surface of the center section excluding the two ends in the longitudinal direction is formed projecting upwardly so as to join with the lower surface of the upper tubular body.

According to a thirteenth aspect of the invention, in the bumper beam according to the eleventh aspect of the invention, for the upper tubular body, the center section excluding both ends in the longitudinal direction is curved so as to project upwardly, and for the lower tubular body, the upper surface of the center section excluding both ends in the longitudinal direction is formed projecting upwardly so as to join with the lower surface of the upper tubular body.

According to a fourteenth aspect of the invention, in the bumper beam according to the tenth aspect of the invention, the center section excluding both ends in the longitudinal direction of the upper tubular body is formed curved so as to project upwardly, and the lower tubular body is formed horizontally across the entire length in the longitudinal direction.

According to a fifteenth aspect of the invention, in the bumper beam according to the tenth aspect of the invention, for the lower tubular body, the lower surface of the center section excluding both ends in the longitudinal direction is formed so as to project downwardly.

According to a sixteenth aspect of the invention, in the bumper beam according to the fifteenth aspect of the invention, for the upper tubular body, the lower surface is formed horizontally across the entire length in the longitudinal direction, and for the lower tubular body, the upper surface is formed horizontally across the entire length in the longitudinal direction so as to join with the lower surface of the upper tubular body.

According to a seventeenth aspect of the invention, in bumper beam according to the tenth aspect of the invention, the front surface of the upper tubular body and the front surface of the lower tubular body are positioned at the same position in the front to rear direction, and the rear surface of the upper tubular body and the rear surface of the lower tubular body are positioned at the same position in the front to rear direction.

According to an eighteenth aspect of the invention, in the bumper beam according to the tenth aspect of the invention, the front surface of the upper tubular body and the front surface of the lower tubular body are positioned at the same position in the front to rear direction, and the rear surface of the upper tubular body is positioned further rearward than the rear surface of the lower tubular body.

According to a nineteenth aspect of the invention, in the bumper beam according to the tenth aspect of the invention, for the upper tubular body, a recess is formed along the longitudinal direction of the lower section of the front surface, and for the lower tubular body, a recess is formed along the longitudinal direction of the upper section of the front surface.

According to a twentieth aspect of the invention, in the bumper beam according to the tenth aspect of the invention, on the upper tubular body, a recess is formed along the longitudinal direction in the lower section of the front surface.

According to a twenty-first aspect of the invention, in the bumper beam according to the tenth aspect of the invention, on the lower tubular body, a recess is formed along the longitudinal direction in the upper section of the front surface.

According to a twenty-second aspect of the invention, in the bumper beam according to the tenth aspect of the invention, the upper tubular body has a thicker plate thickness than that of the lower tubular body.

According to a twenty-third aspect of the invention, in the bumper beam according to the sixth aspect of the invention, two tubular bodies are provided and the two tubular bodies are joined together across the entire length in the longitudinal direction.

According to a twenty-fourth aspect of the invention, in the bumper beam according to the twenty-third aspect of the invention, for the two tubular bodies, the center section excluding the two ends in the longitudinal direction is formed curved so as to project forward.

According to a twenty-fifth aspect of the invention, in the bumper beam according to the sixth aspect of the invention, two tubular bodies are provided, and the two ends in the longitudinal direction are joined to each other. Here, for the front tubular body of the two tubular bodies, the center section excluding the two ends in the longitudinal direction is formed curved so as to project forward. And for the rear tubular body of the two tubular bodies, the center section excluding the two ends in the longitudinal direction is formed curved so as to project forward only to an extent that is less than the extent to which the front tubular body projects.

In accordance with the bumper beam for automobile of the present invention, because tubular bodies formed by tube hydroforming are joined to each other in a parallel state, the bumper beam can be made small while retaining a high degree of freedom of shape.

DETAILED DESCRIPTION OF THE INVENTION

Figure 1:
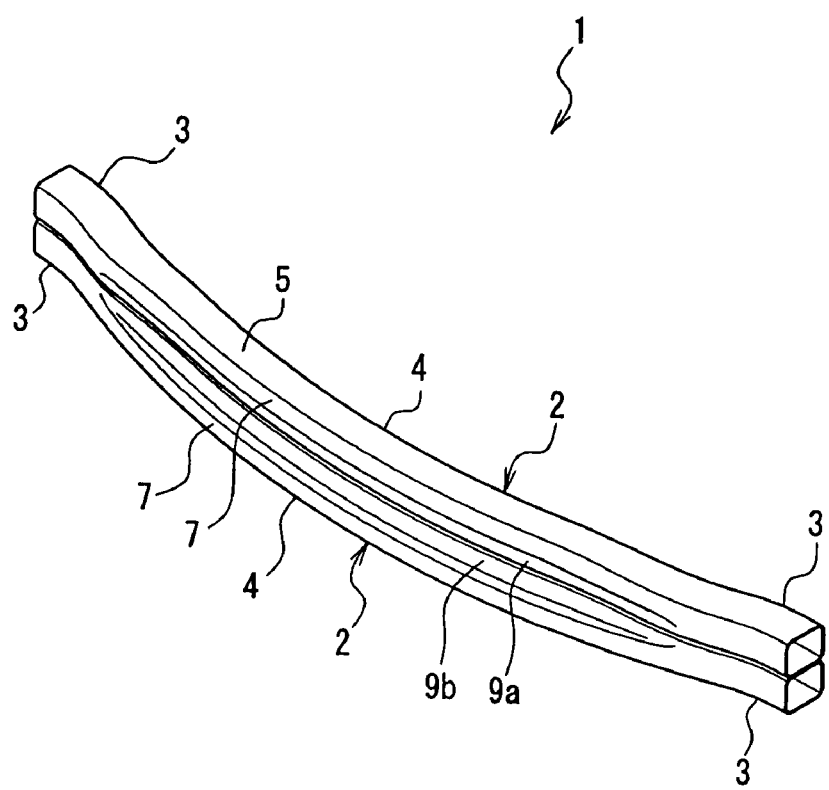
FIG. 1 is an oblique view of a first embodiment of the present invention.
Figure 2:
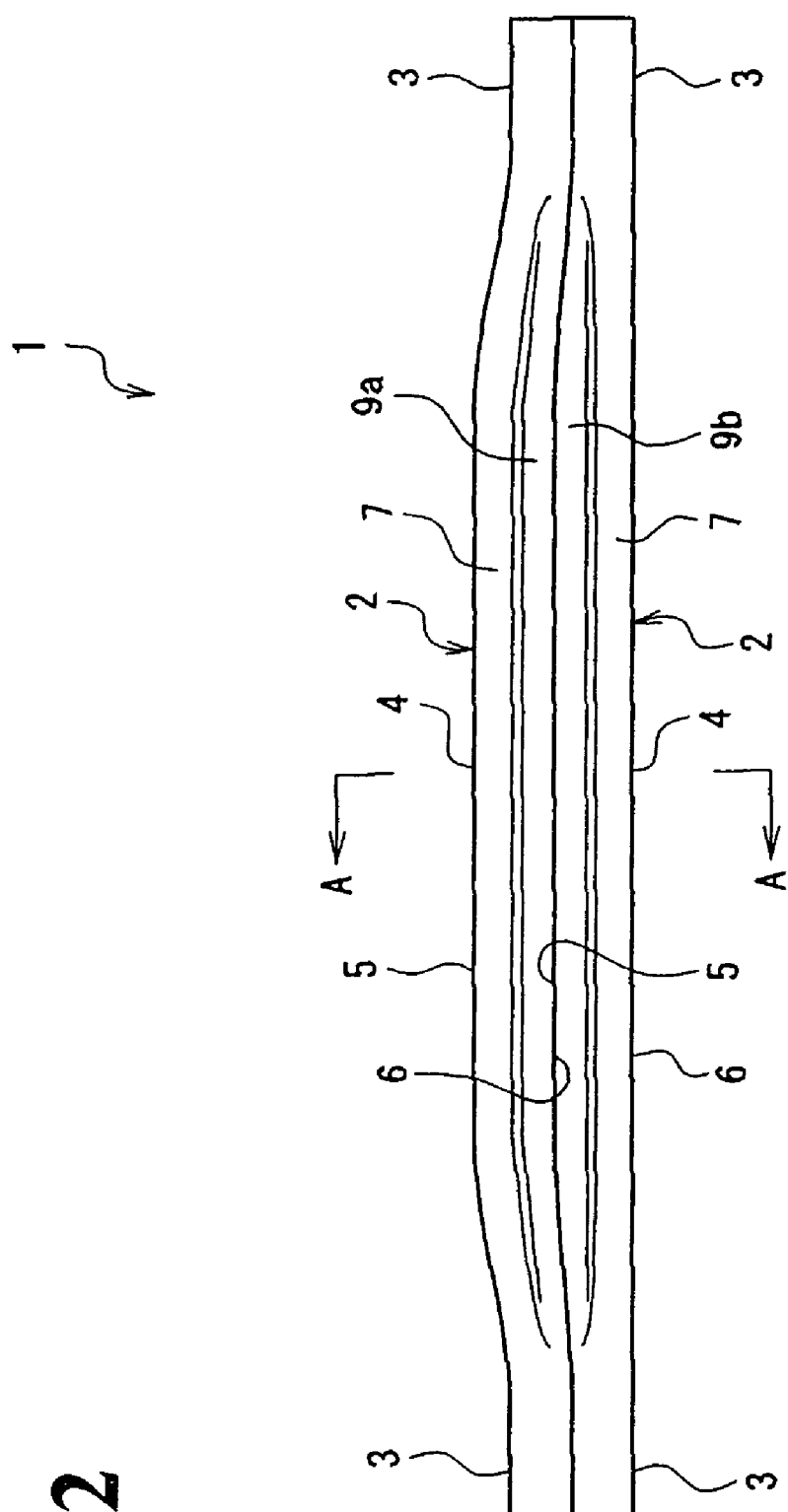
FIG. 2 is a front view of the same.
Figure 3:
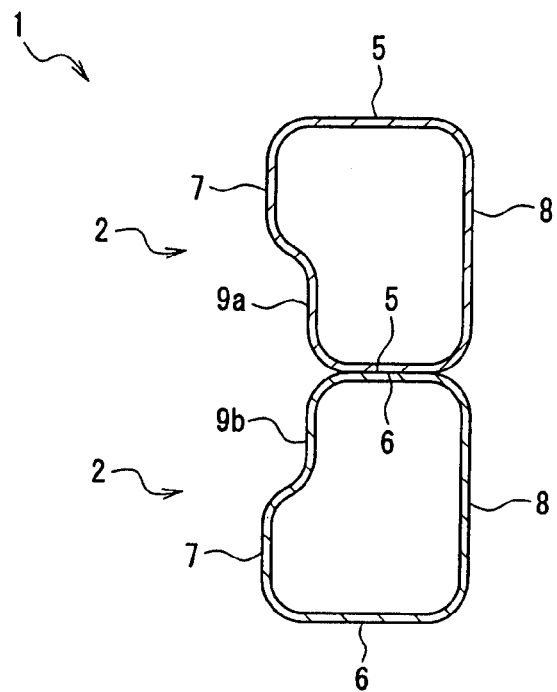
FIG. 3 is an enlarged end view from the A-A line in FIG. 2 of the same.

FIGS. 1-3 show a first embodiment of the present invention. The legend 1 in the drawings is a bumper beam for automobile that protects an automobile from impact in a collision. This bumper beam 1 is a constituent body disposed on the inner side of a bumper face, and extends longitudinally left and right and is attached to the front or rear of an automobile.

This bumper beam 1 comprises a plurality of tubular bodies 2, 2 formed by tube hydroforming and extending left and right. The plurality of tubular bodies 2, 2 of the bumper beam 1 are joined to each other in a parallel state. Here, the vertical cross-section shape of each of the plurality of tubular bodies 2, 2 (i.e., the cross section orthogonal to the tubular body longitudinal direction) have a substantially rectangular shape comprising the top and bottom and front and rear sides (see FIG. 3). The surfaces of the plurality of tubular bodies 2, 2 that face each other across the entire length in the longitudinal direction are joined to each other. More specifically, the plurality of tubular bodies 2, 2 are disposed in a line vertically. The two ends 3, 3 in the longitudinal direction of the uppermost tubular body 2 of the plurality of tubular bodies 2, 2 are formed horizontally. Furthermore, for the uppermost tubular body 2 of the plurality of tubular bodies 2, 2, an upper surface 5 of a center section 4 excluding the two ends 3, 3 in the longitudinal direction is formed to project upwardly.

Specifically, the bumper beam 1 comprises two tubular bodies 2. The tubular bodies 2, 2 are made, for example, of high-tensile steel. The two ends 3, 3 in the longitudinal direction of the upper tubular body 2 of the two tubular bodies 2, 2 are formed horizontally. For the upper tubular body 2, the upper surface 5 of the center section 4 excluding the two ends 3, 3 in the longitudinal direction is formed to project upwardly. Meanwhile, for the lower tubular body 2 of the two tubular bodies 2, 2, the two ends 3, 3 in the longitudinal direction are formed horizontally so as to join with the upper tubular body 2. For the lower tubular body 2, a lower surface 6 is formed horizontally along the entire length, including the two ends 3, 3 in the longitudinal direction.

For the upper tubular body 2, the lower surface 6 of the center section 4 excluding the two ends 3, 3 in the longitudinal direction is formed depressed upwardly to an extent that is smaller than the extent to which the upper surface 5 projects. For the lower tubular body 2, the upper surface 5 of the center section 4 excluding the two ends 3, 3, in the longitudinal direction is formed to project upwardly so as to join with the lower surface 6 of the upper tubular body 2. Thus, the tubular bodies 2, 2 are joined together across the entire length in the longitudinal direction. More specifically, for the two tubular bodies 2, 2, the lower surface 6 of the upper tubular body 2 and the upper surface 5 of the lower tubular body 2, which face each other, are joined across the entire length in the longitudinal direction.

A front surface 7 of the upper tubular body 2 and a front surface 7 of the lower tubular body 2 are positioned at the same position in the front and rear directions. Similarly, a rear surface 8 of the upper tubular body 2 and a rear surface 8 of the lower tubular body 2 are positioned at the same position in the front and rear directions. For each of the tubular bodies 2, 2, the two ends 3, 3 in the longitudinal direction extend substantially directly sideways, and the center section 4 excluding the two ends 3, 3 in the longitudinal direction is formed curved so as to project forward.

In the upper tubular body 2, a recess 9a is formed along the longitudinal direction on the lower section of the front surface, excluding the two ends 3, 3. In the lower tubular body 2, a recess 9b is formed along the longitudinal direction on the upper section of the front surface, excluding the two ends 3, 3. These tubular bodies 2, 2 are joined in a parallel state, by welding, adhesion, bolting or the like.

Figure 4:
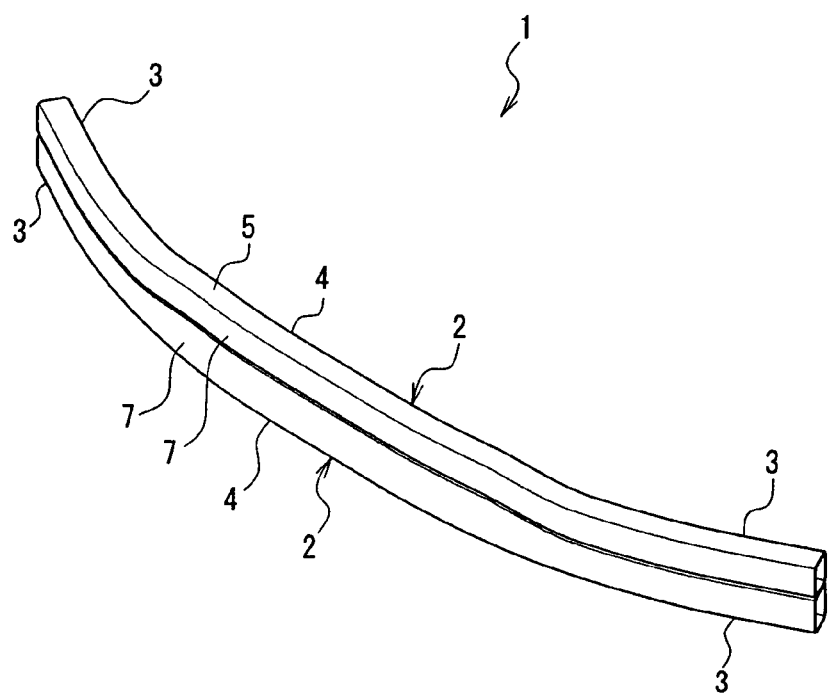
FIG. 4 is an oblique view of a second embodiment of the present invention.
Figure 5:
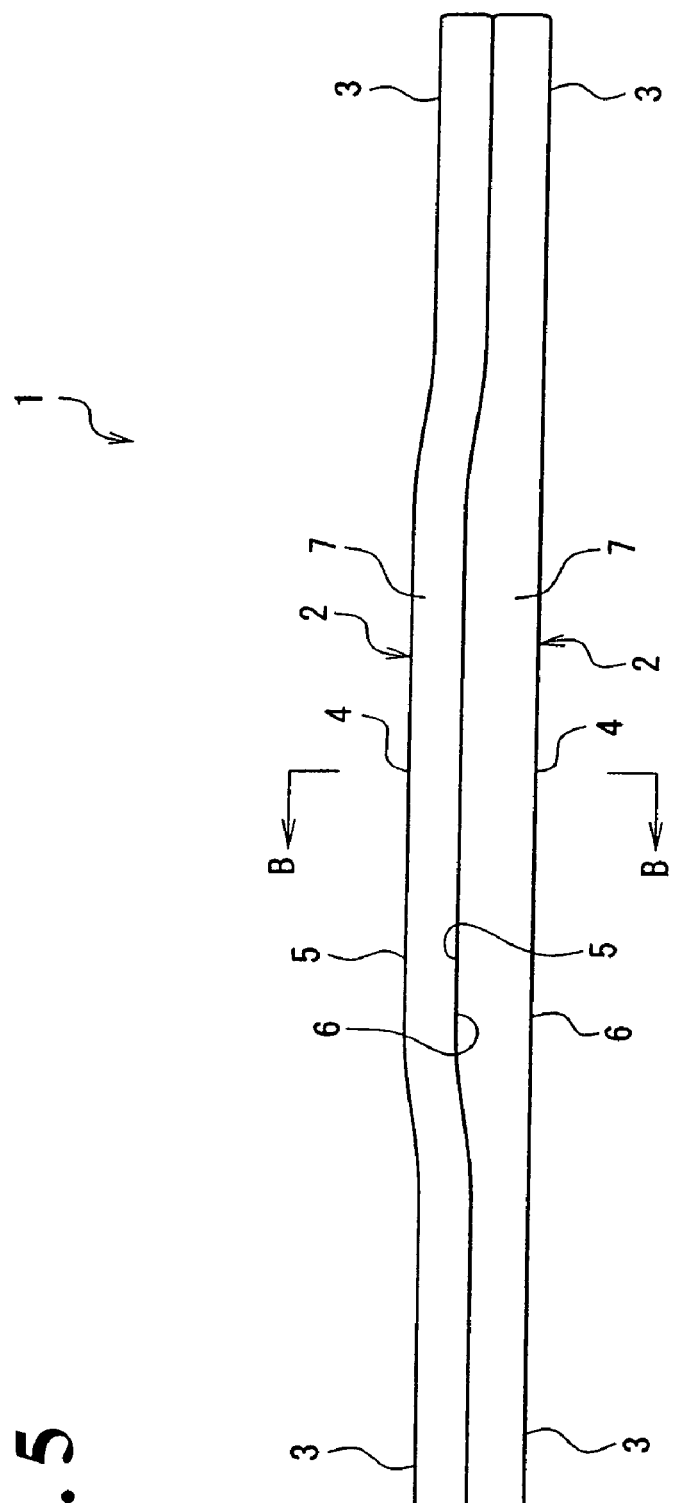
FIG. 5 is a front view of the same.
Figure 6:
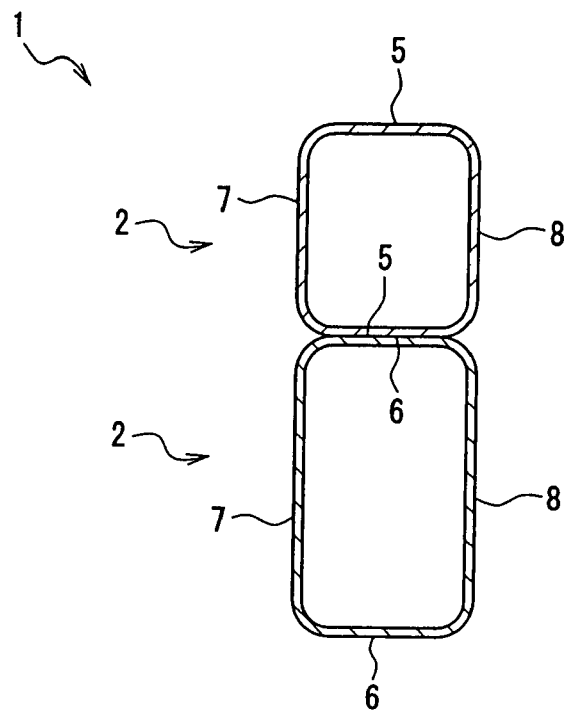
FIG. 6 is an enlarged end view along the B-B line in FIG. 5 of the same.

FIGS. 4-6 show a second embodiment of the present invention. This embodiment differs from the first embodiment in that in the upper tubular body 2 and the lower tubular body 2, the positions of the joining surfaces in the center sections 4, 4 excluding the two ends 3, 3 in the longitudinal direction are different, and in that this embodiment does not have the recesses 9a and 9b, but the two embodiments are substantially the same in other respects. An explanation will be given primarily of the differences.

In the upper tubular body 2 in the bumper beam 1, in the center section 4 excluding the two ends 3, 3 in the longitudinal direction, the lower surface 6 is depressed upwardly to the same extent that the upper surface 5 projects. More specifically, the center section 4 of upper tubular body 2 excluding the two ends 3, 3 in the longitudinal direction is formed curved so as to project upwardly. In the lower tubular body 2 of the bumper beam 1, the upper surface 5 of the center section 4 excluding the two ends 3, 3 in the longitudinal direction is formed projecting upwardly so as to join with the lower surface 6 of the upper tubular body 2. Thus, for the two tubular bodies 2, 2, surfaces facing each other (i.e., the lower surface 6 of the upper tubular body 2 and the upper surface 5 of the lower tubular body 2) are joined across the entire length in the longitudinal direction.

The front surface 7 of the upper tubular body 2 and the front surface 7 of the lower tubular body 2 are positioned at the same position in the front and rear directions. Similarly, the rear surface 8 of the upper tubular body 2 and the rear surface 8 of the lower tubular body 2 are positioned at the same position in the front and rear directions. The tubular bodies 2, 2 are formed curved so as to project forward across the entire length in the longitudinal direction.

Figure 7:
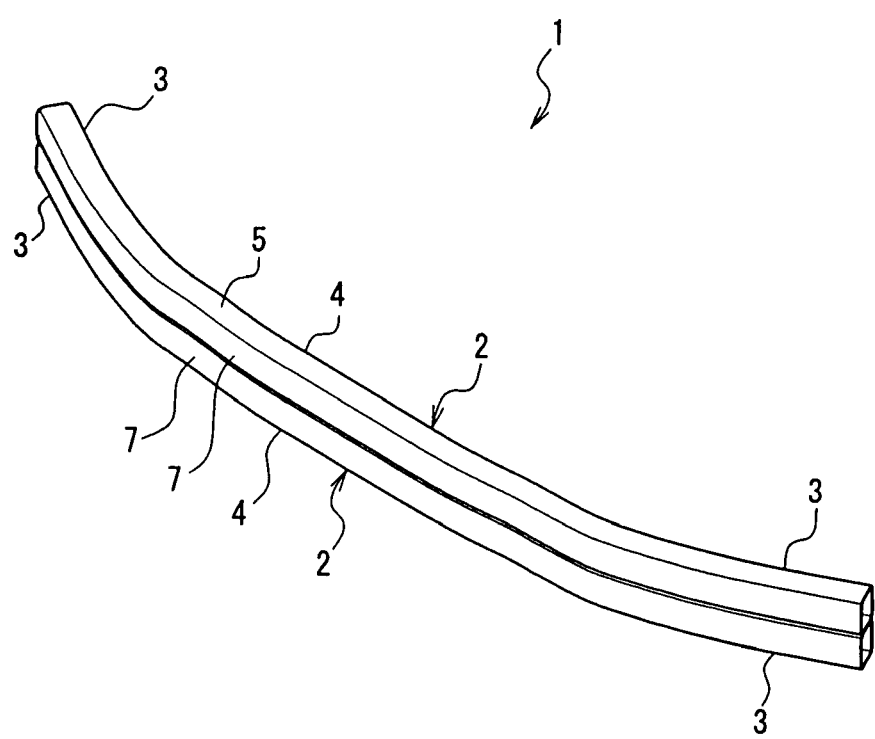
FIG. 7 is an oblique view of a third embodiment of the present invention
Figure 8:
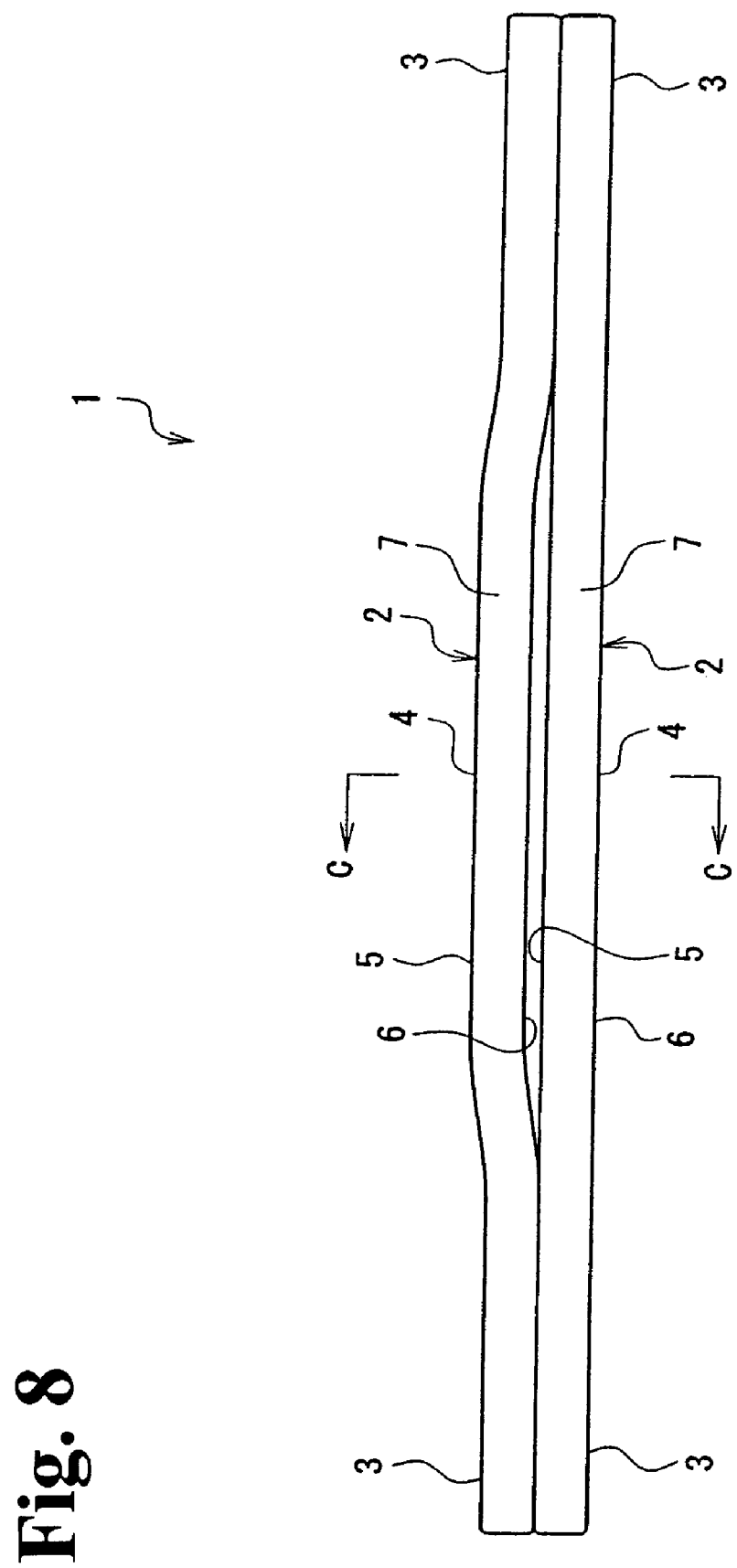
FIG. 8 is a front view of the same.
Figure 9:
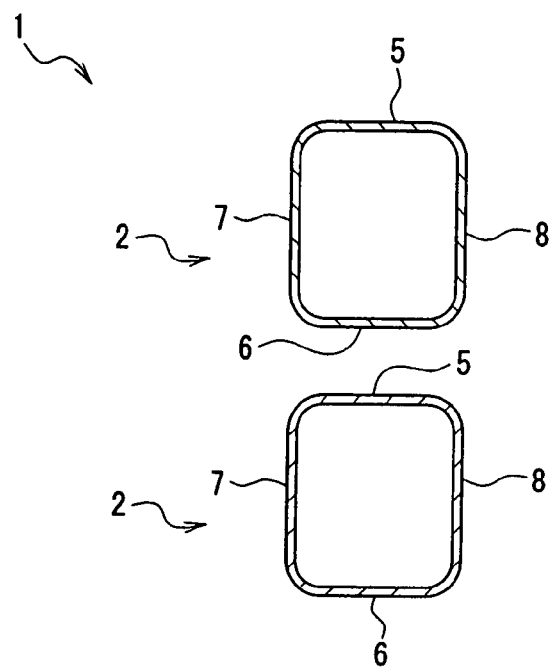
FIG. 9 is an enlarged end view along the C-C line in FIG. 8 of the same.

FIGS. 7-9 show a third embodiment of the present invention. The third embodiment differs from the second embodiment in that in the lower tubular body 2, the shape of the upper surface 5 of the center section 4 excluding the two ends 3, 3 in the longitudinal direction is different; however, the two embodiments are substantially the same in other respects. An explanation will be given primarily of the differences.

In the upper tubular body 2 of the bumper beam 1, the center section 4 excluding the two ends 3, 3 in the longitudinal direction is curved so as to project upwardly, but the lower tubular body 2 is formed horizontally along the entire length in the longitudinal direction. Thus, the upper tubular body 2 and the lower tubular body 2 have center sections 4, 4 excluding the two ends 3, 3 in the longitudinal direction that are separated from each other. (More specifically, the lower surface 6 of the upper tubular body 2 and the upper surface 5 of the lower tubular body 2 are separated from each other.)

Figure 10:
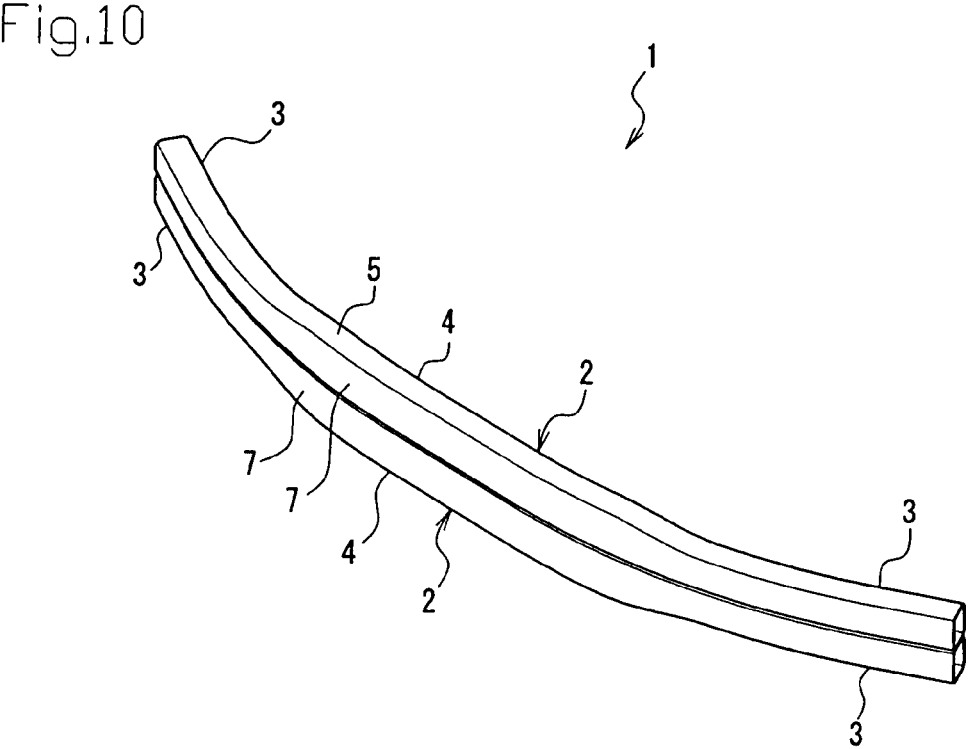
FIG. 10 is an oblique view of a fourth embodiment of the present invention.
Figure 11:
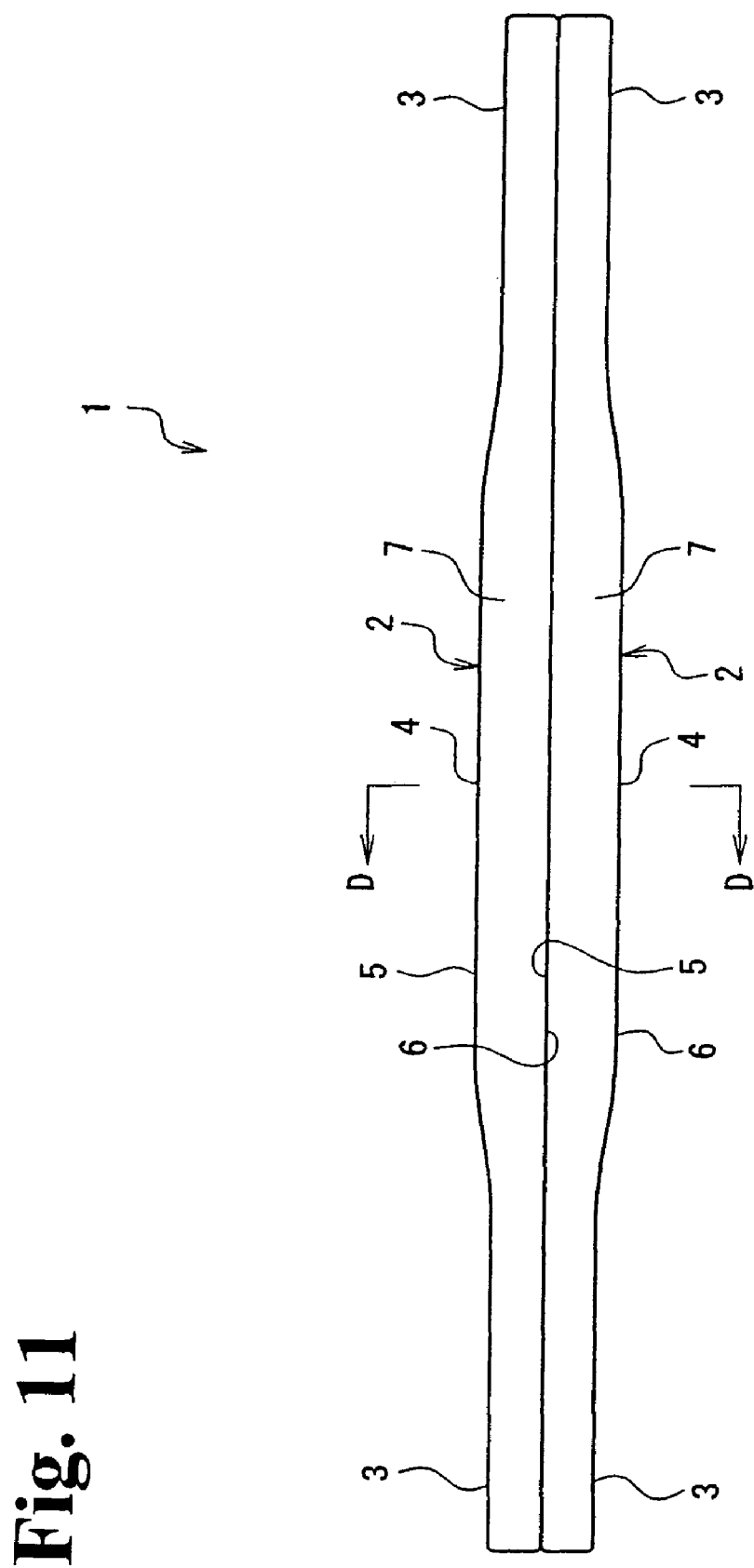
FIG. 11 is a front view of the same.
Figure 12:
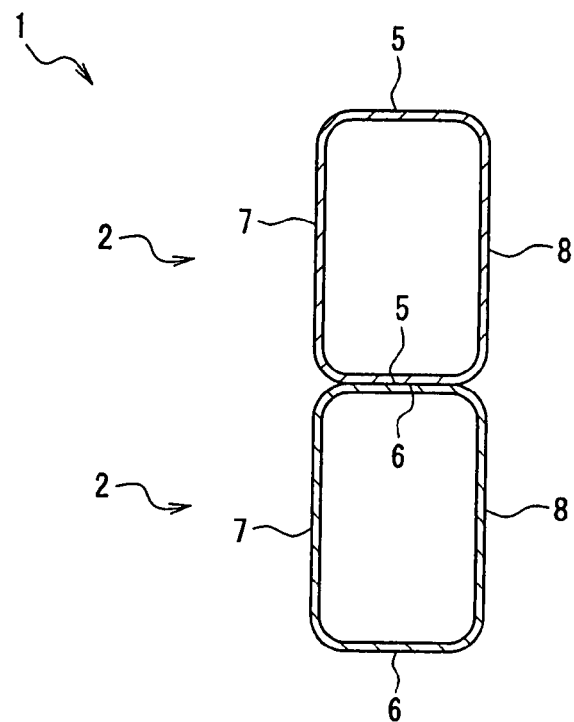
FIG. 12 is an enlarged end view along the D-D line in FIG. 11 of the same.

FIGS. 10-12 show a fourth embodiment of the present invention. This embodiment differs from the second embodiment in that for the upper tubular body 2, the lower surface 6 in the center section 4 excluding the two ends 3, 3 in the longitudinal direction is shaped differently, and for the lower tubular body 2, the upper surface 5 and the lower surface 6 in the center section excluding the two ends 3, 3 in the longitudinal direction are shaped differently, but the two embodiments are substantially the same in other respects. An explanation will be given primarily of the differences.

In the upper tubular body 2 of the bumper beam 1 the lower surface 6 is formed horizontally along the entire length in the longitudinal direction. In the lower tubular body 2 in the bumper beam 1, the upper surface 5 is formed horizontally along the entire length in the longitudinal direction so as to join with the lower surface 6 of the upper tubular body 2. Thus, surfaces that face each other of the two tubular bodies 2, 2 are joined across the entire length in the longitudinal direction.

In the lower tubular body 2, the lower surface 6 of the center section 4 excluding the two ends 3, 3 in the longitudinal direction is formed projecting downwardly. Generally, in cases where the bumper beam 1 comprises a plurality of tubular bodies 2, 2, including cases where it comprises two tubular bodies 2, 2, in the lowermost tubular body 2 of the plurality of tubular bodies 2, 2, the lower surface 6 is formed to project downwardly in the center section 4 excluding the two ends 3, 3 in the longitudinal direction.

Figure 13:
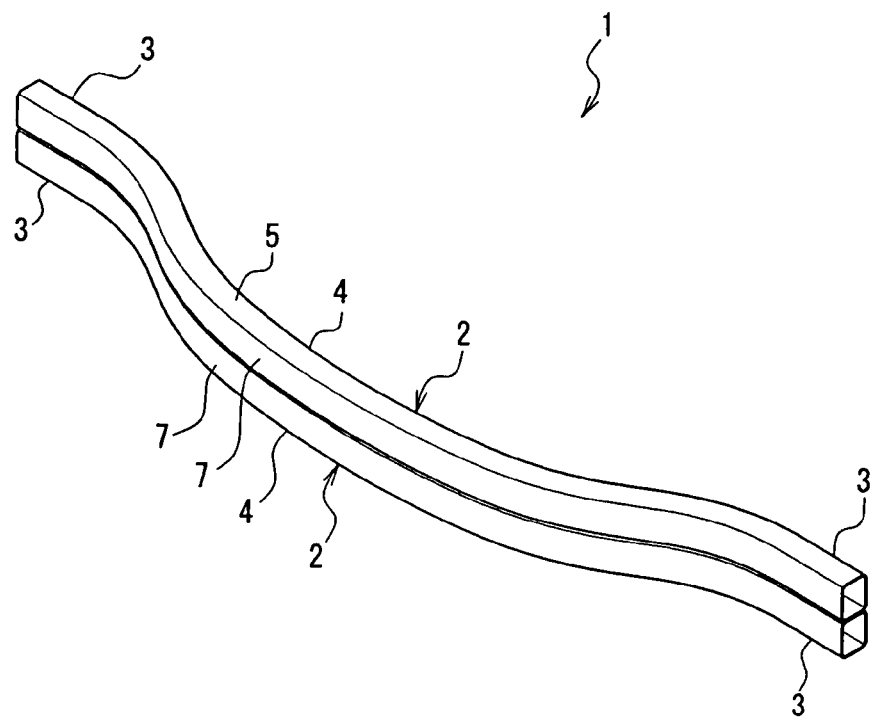
FIG. 13 is an oblique view of a fifth embodiment of the present invention.
Figure 14:
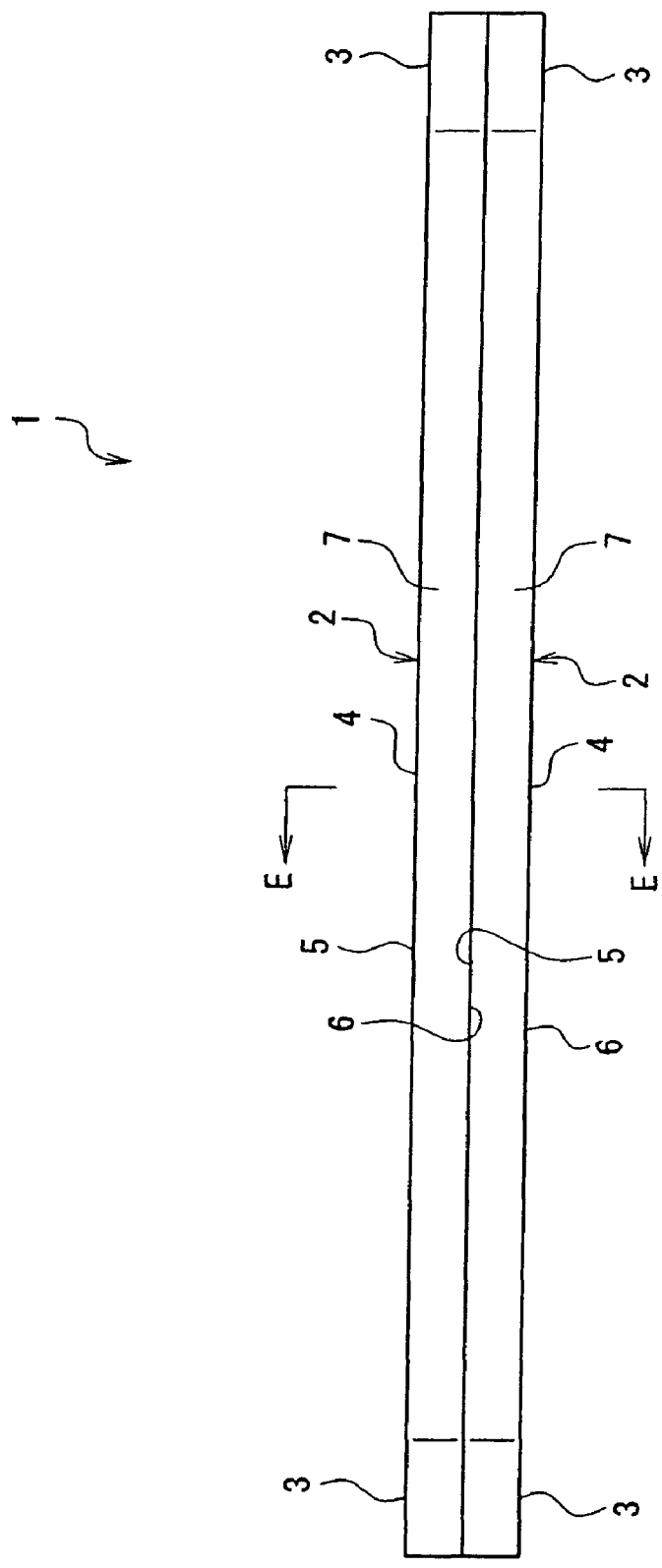
FIG. 14 is a front view of the same.
Figure 15:
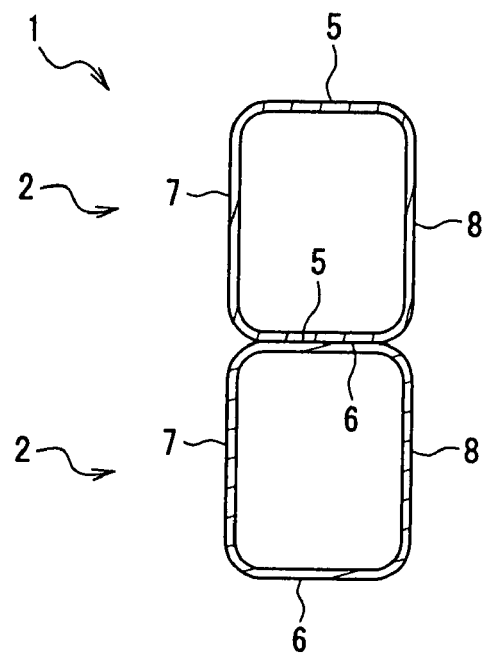
FIG. 15 is an enlarged end view along the E-E line in FIG. 14 of the same.

FIGS. 13-15 show a fifth embodiment of the present invention. This embodiment differs from the first embodiment in that the upper and lower tubular bodies 2, 2 have differently shaped center sections 4 excluding both ends 3, 3 in the longitudinal direction, and in that there are no recesses 9a and 9b; however, the two embodiments are substantially the same in other respects. An explanation will be given primarily of the differences.

The upper tubular body 2 and the lower tubular body 2 of the bumper beam 1 are formed horizontally along the entire length, including the two ends 3, 3 in the longitudinal direction. More specifically, for the upper tubular body 2 and the lower tubular body 2, the upper surfaces 5 and the lower surfaces 6 are formed horizontally across the entire length in the longitudinal direction. And for the two tubular bodies 2, 2, surfaces that face each other across the entire length in the longitudinal direction (i.e., the lower surface 6 of the upper tubular body 2 and the upper surface 5 of the lower tubular body 2) are joined. Further the two tubular bodies 2, 2 have the same vertical cross-section shape and same plate thickness. (See FIG. 15).

Figure 16:
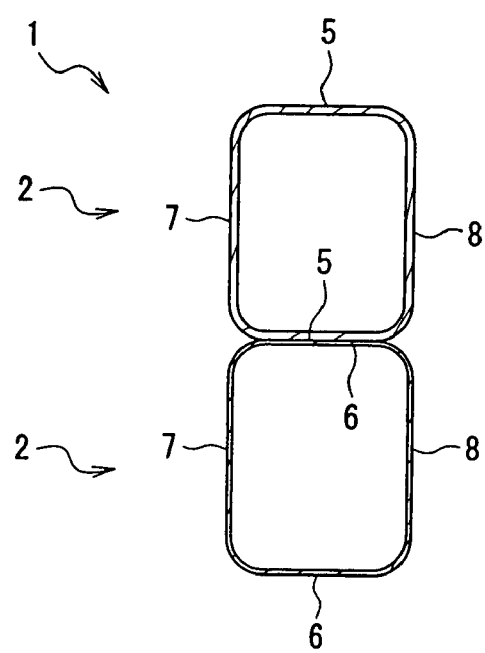
FIG. 16 is a drawing corresponding to FIG. 15 of a sixth embodiment of the present invention.

FIG. 16 shows a sixth embodiment of the present invention. This embodiment differs from the fifth embodiment in that the plate thickness of the two tubular bodies 2, 2 is not the same. More specifically, of the two tubular bodies 2, 2 that constitute the bumper beam 1, the upper tubular body 2 has a plate thickness that is thicker than that of the lower tubular body 2. Generally, in cases where the bumper beam 1 comprises a plurality of tubular bodies 2, 2, including cases where it comprises two tubular bodies 2, 2, at least two tubular bodies 2, 2 of the plurality of tubular bodies 2, 2 have plate thicknesses that are different from one another.

Figure 17:
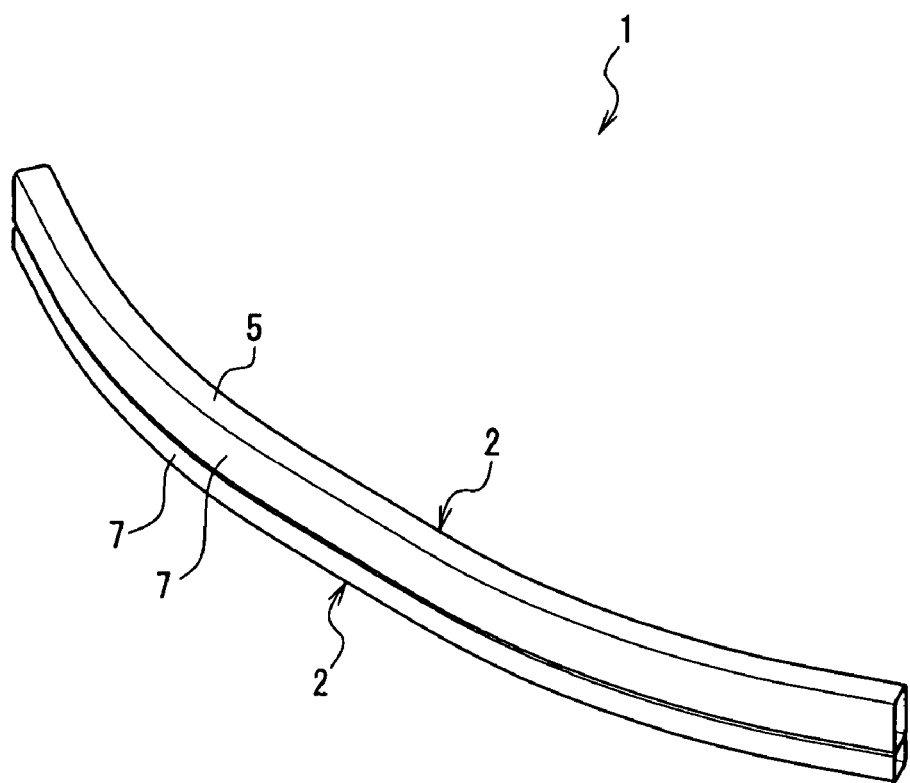
FIG. 17 is an oblique view of a seventh embodiment of the present invention.
Figure 18:
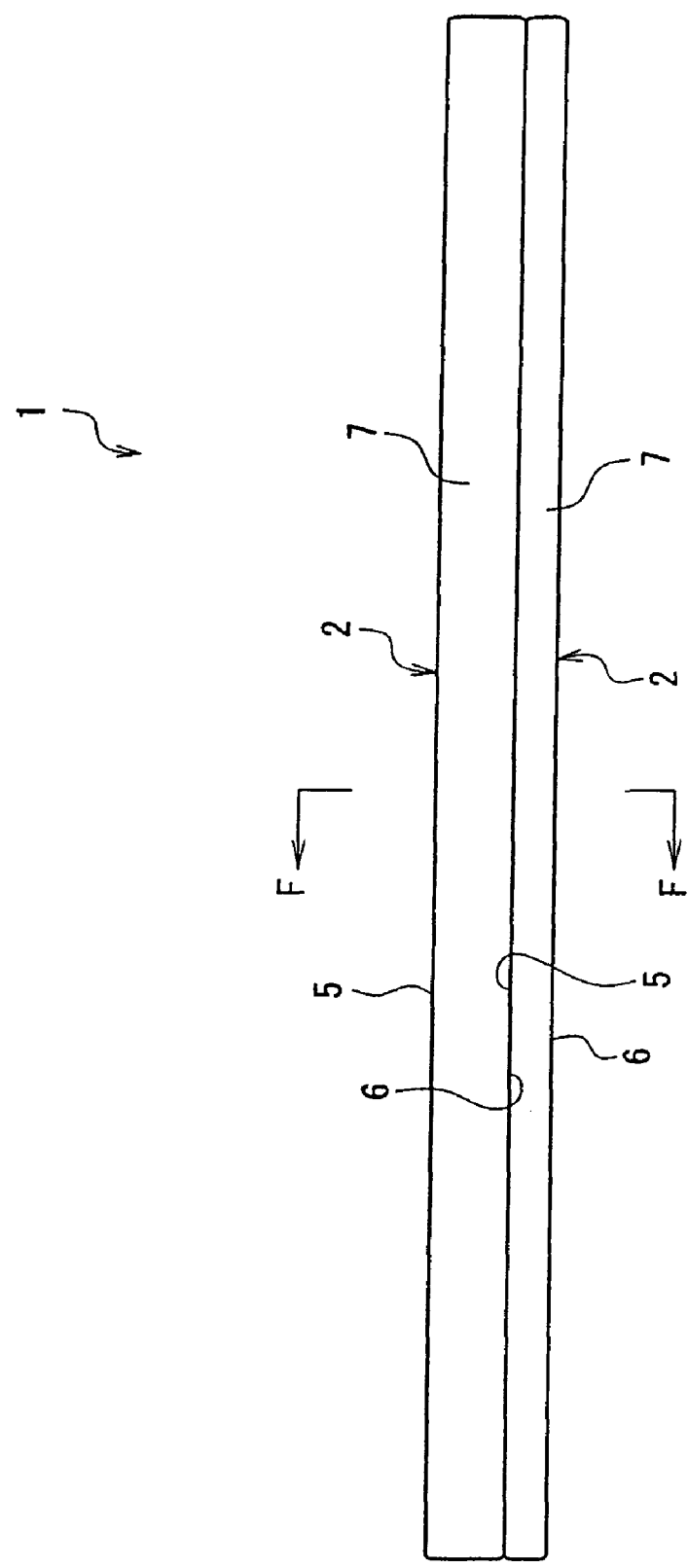
FIG. 18 is a front view of the same.
Figure 19:
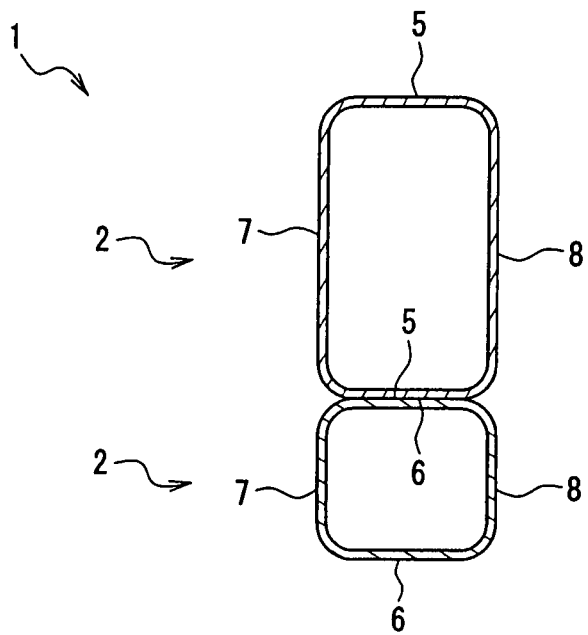
FIG. 19 is an enlarged end view along the F-F line in FIG. 18 of the same.

FIGS. 17-19 show a seventh embodiment of the present invention. This embodiment differs from the fifth embodiment in that the vertical cross-section shapes of the upper tubular body 2 and the lower tubular body 2 are not the same; otherwise they are substantially the same in other respects. An explanation will be given primarily of the differences.

In the bumper beam 1, while the vertical cross-section shape of the upper tubular body 2 has a rectangular shape with longer vertical sides, the vertical cross-section shape of the lower tubular body 2 has a rectangular shape with longer horizontal sides (see FIG. 19). Here, the front surface 7 of the upper tubular body 2 and the front surface 7 of the lower tubular body 2 are positioned at the same position in the front and rear directions. Similarly, the rear surface 8 of the upper tubular body and the rear surface 8 of the lower tubular body are positioned at the same position in the front and rear directions. The tubular bodies 2, 2 each are formed curved so as to project forward along the entire length in the longitudinal direction.

Figure 20:
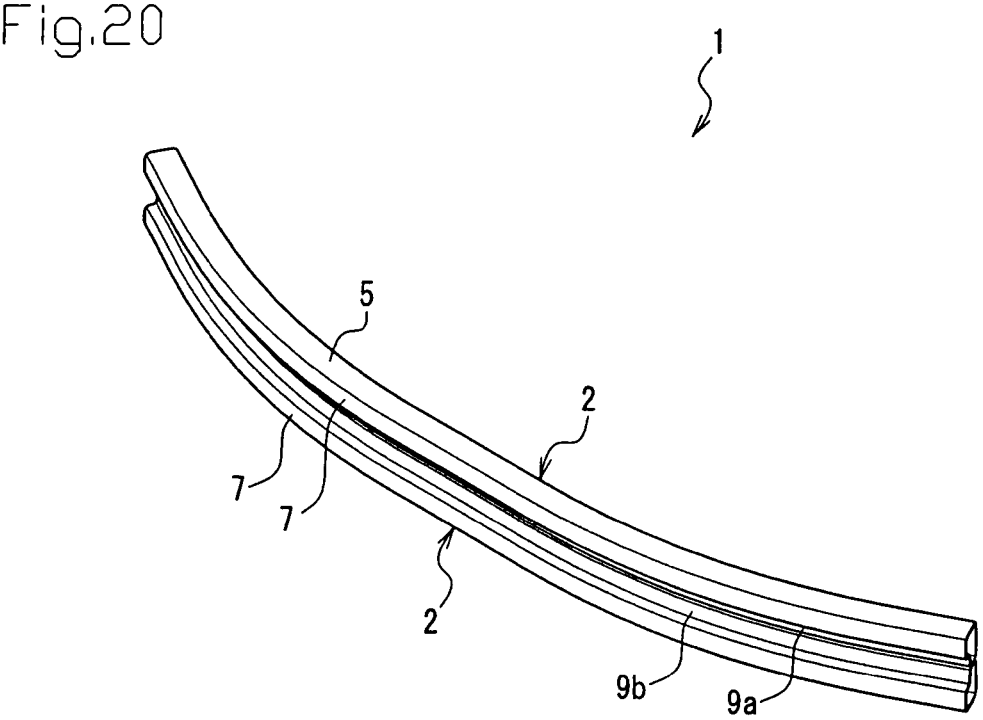
FIG. 20 is an oblique view of an eighth embodiment of the present invention.
Figure 21:
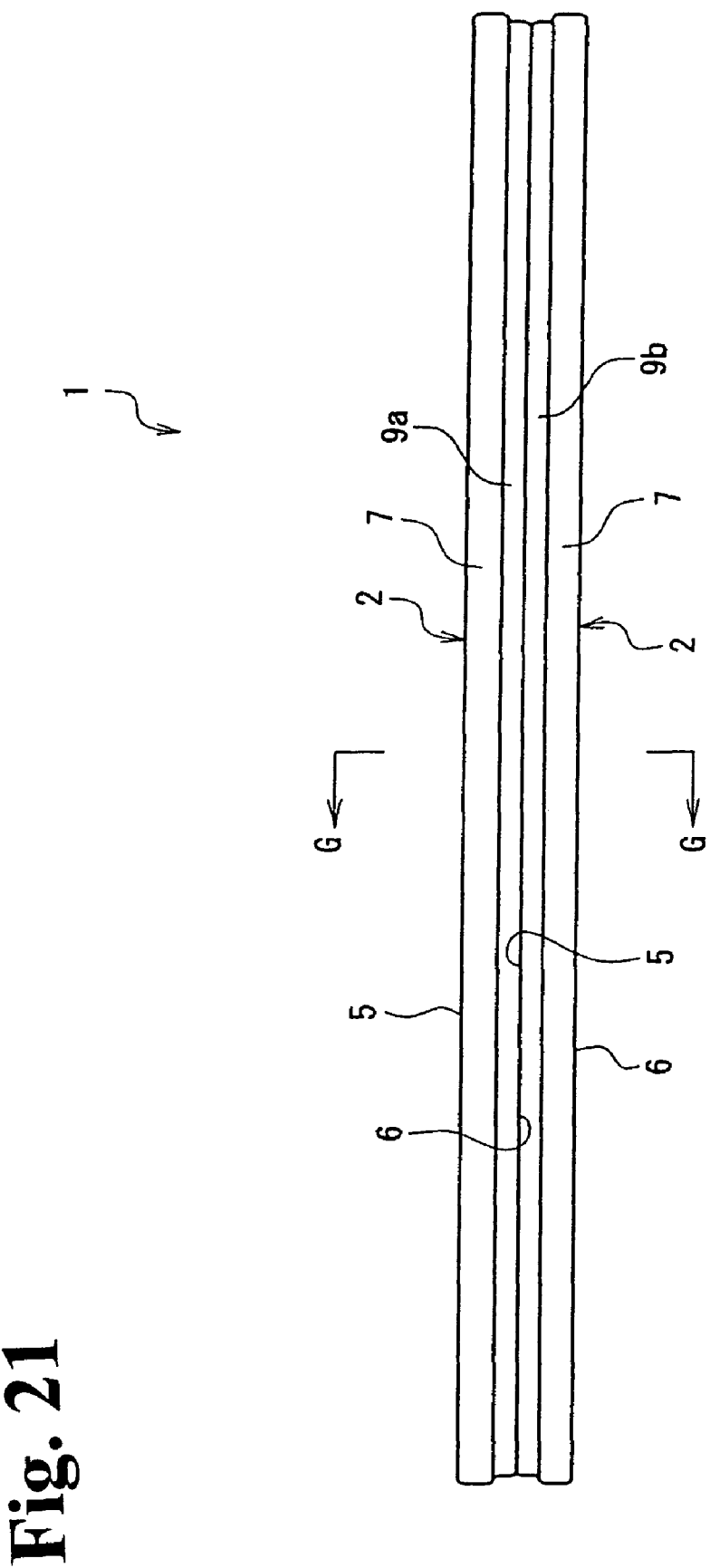
FIG. 21 is a front view of the same.
Figure 22:
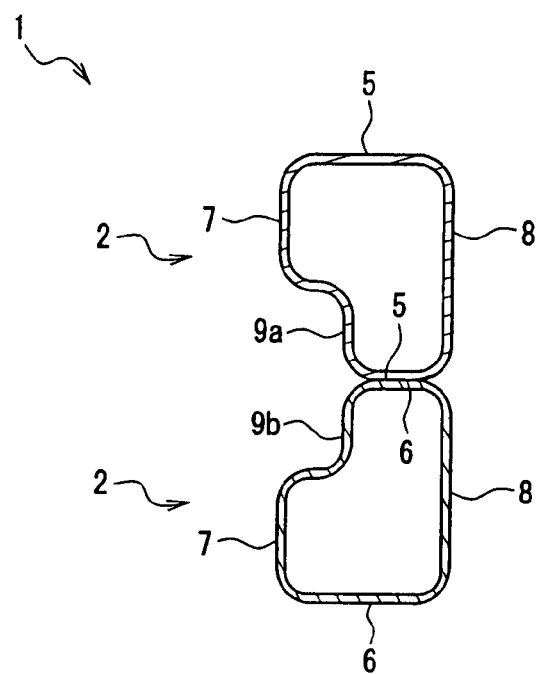
FIG. 22 is an enlarged end view along the G-G line in FIG. 21 of the same.

FIGS. 20-22 show an eighth embodiment of the present invention. This embodiment differs from the fifth embodiment in that this embodiment is provided with recesses 9a, 9b in the upper and lower tubular bodies 2, 2, but the two embodiments are substantially the same in other respects. An explanation will be given primarily of the differences.

In the upper tubular body 2 of the bumper beam 1, the recess 9a is formed along the longitudinal direction across the entire length of the bottom section of the front surface. In the lower tubular body 2 in the bumper beam 1, the recess 9b is formed along the longitudinal direction across the entire length of the upper section of the front surface.

In the embodiment shown in the drawings, the upper tubular body 2 and the lower tubular body 2 have vertical cross-section shapes that are vertical inversions of each other (see FIG. 22). Each of the tubular bodies 2, 2 is formed curved so as to project forward across the entire length in the longitudinal direction.

Figure 23:
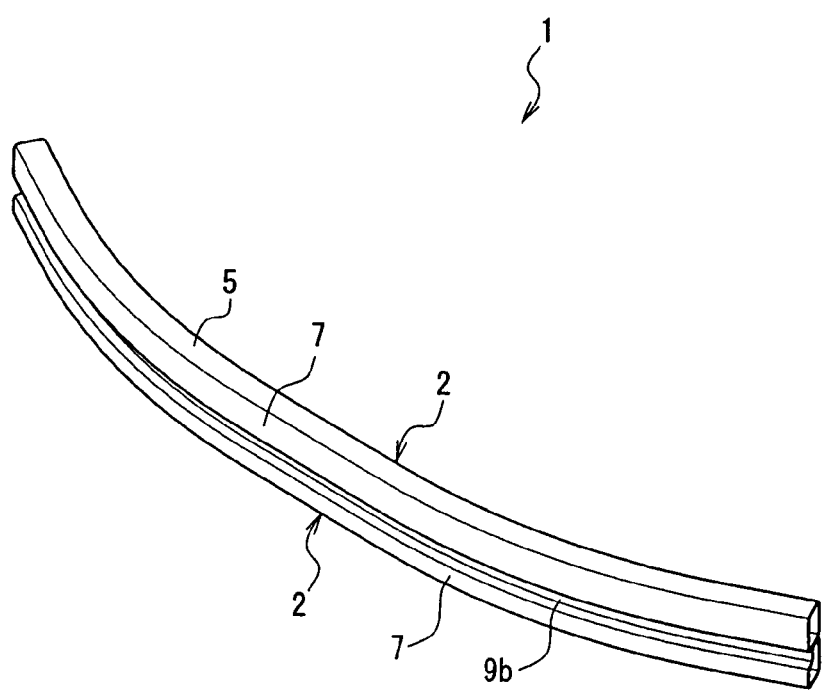
FIG. 23 is an oblique view of a ninth embodiment of the present invention.
Figure 24:
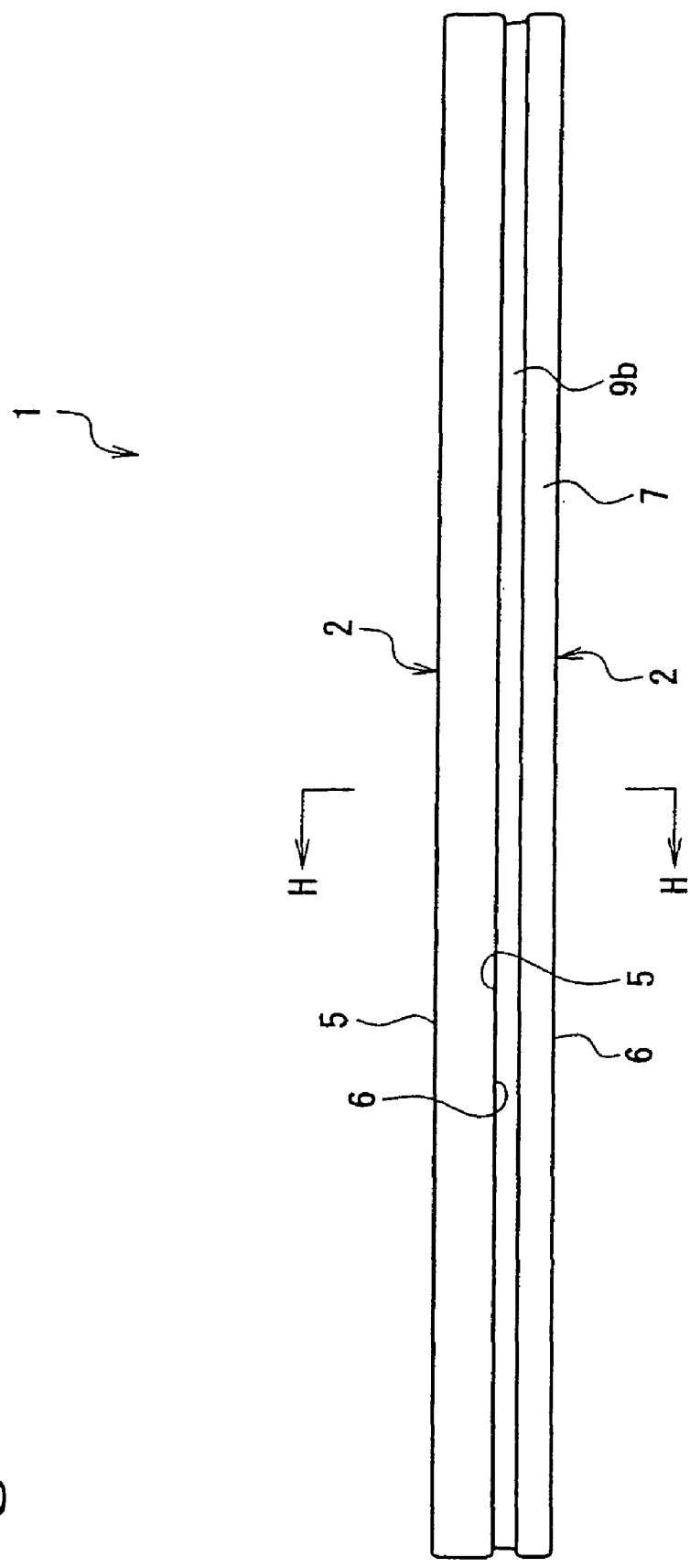
FIG. 24 is a front view of the same.
Figure 25:
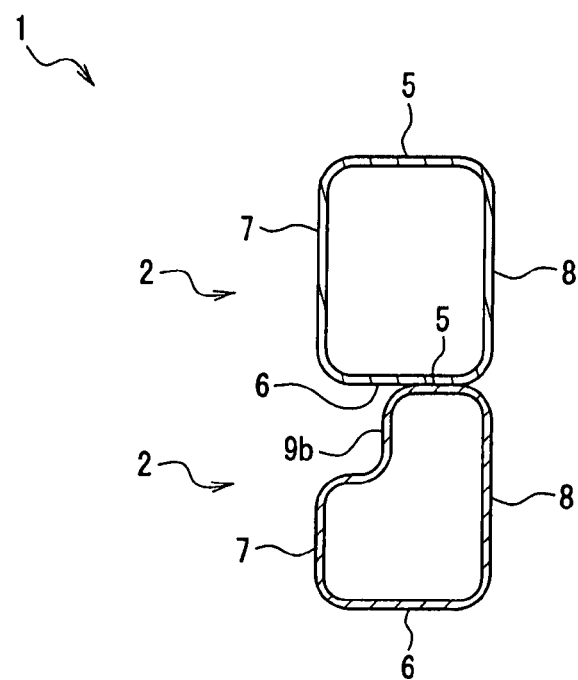
FIG. 25 is an enlarged end view along the H-H line in FIG. 24 of the same.

FIGS. 23-25 show a ninth embodiment of the present invention. This embodiment differs from the eighth embodiment in that it is provided with a recess 9b only in the lower tubular body 2, but the two embodiments are substantially the same in other respects.

More specifically, in the bumper beam 1, while the upper tubular body does not have the recess 9a, the lower tubular body 2 has the recess 9b formed along the longitudinal direction across the entire length on the upper section of the front surface.

Figure 26:
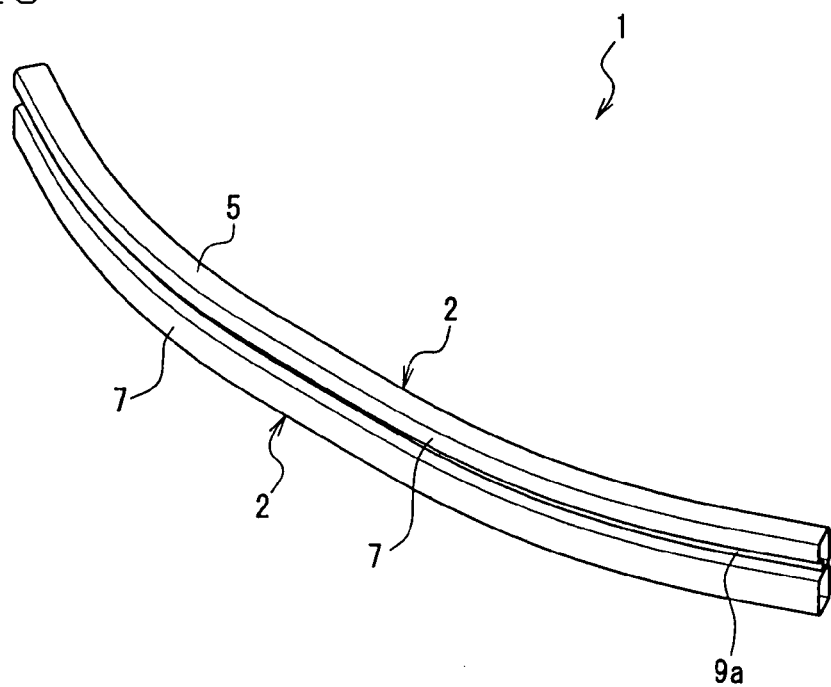
FIG. 26 is an oblique view of a tenth embodiment of the present invention.
Figure 27:
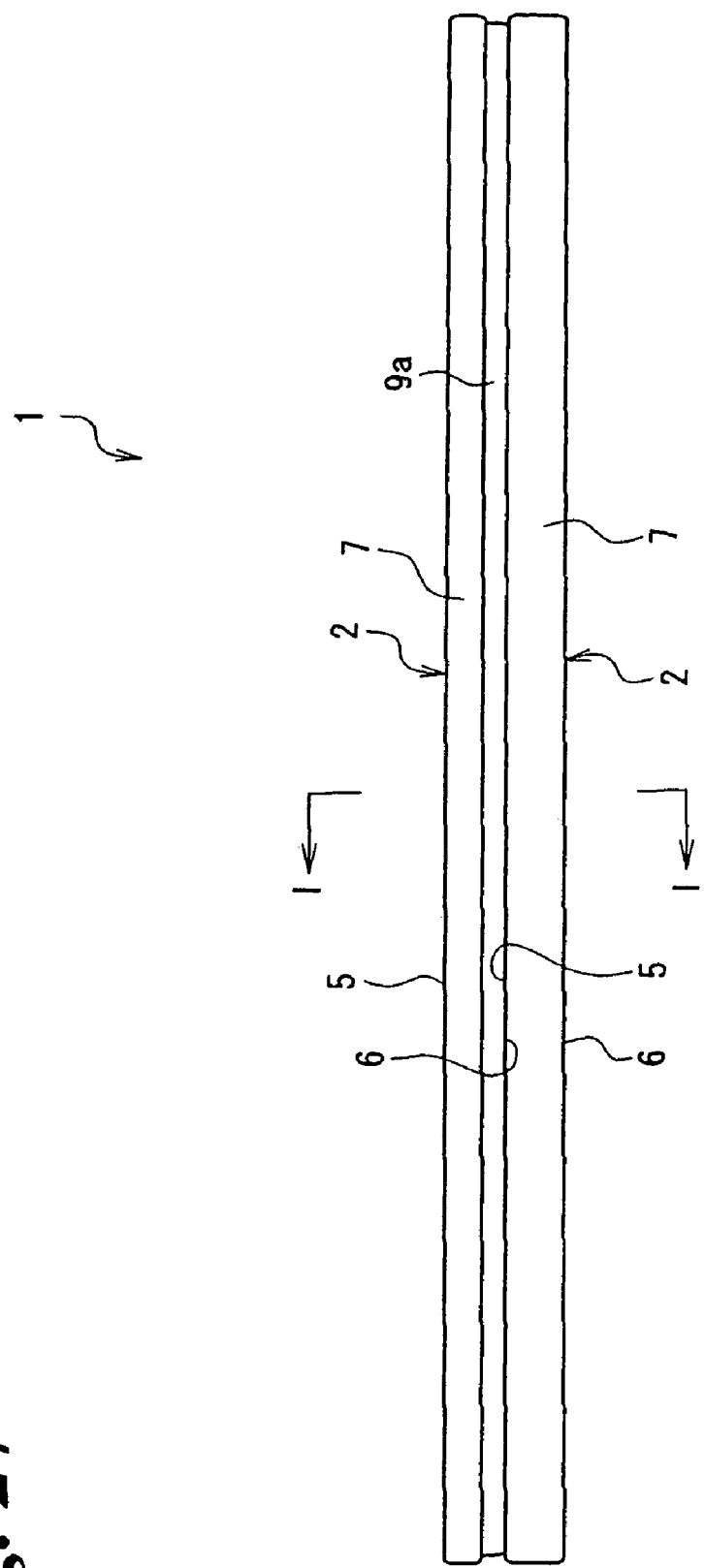
FIG. 27 is a front view of the same.
Figure 28:
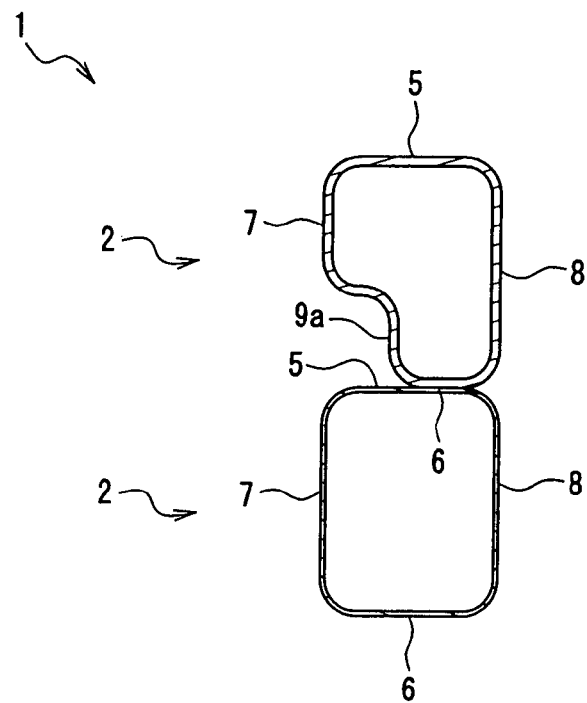
FIG. 28 is an enlarged end view along the I-I line in FIG. 27 of the same.

FIGS. 26-28 show a tenth embodiment of the present invention. This embodiment differs from the eighth embodiment in that only the upper tubular body 2 is provided with a recess 9a, and that the plate thicknesses of the two tubular bodies 2, 2 are not the same; however, the two embodiments are substantially the same in other respects.

More specifically, while the lower tubular body 2 does not have the recess 9b, the upper tubular body 2 has the recess 9b formed along the longitudinal direction across the entire length on the lower section of the front surface. Further, the plate thicknesses of the two tubular bodies 2, 2 are different from each other. In the embodiment shown in the drawings, the plate thickness of the upper tubular body 2 is thicker than that of the lower tubular body 2.

Figure 29:
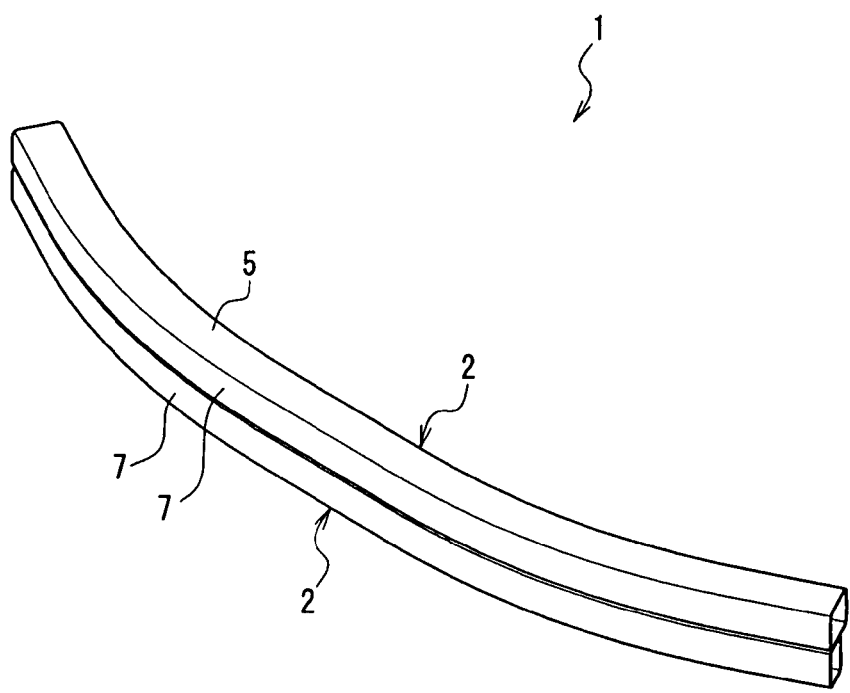
FIG. 29 is an oblique view of an eleventh embodiment of the present invention.
Figure 30:
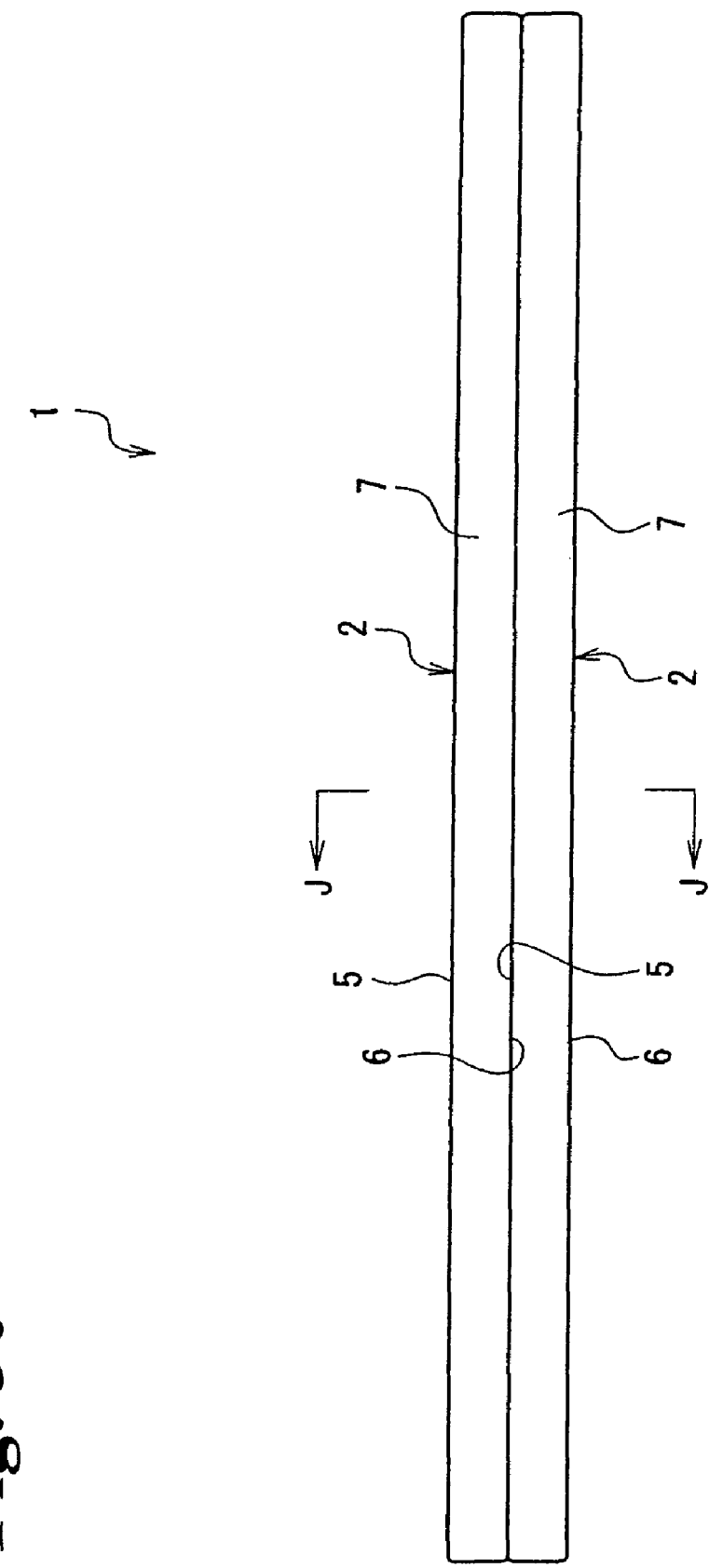
FIG. 30 is a front view of the same.
Figure 31:
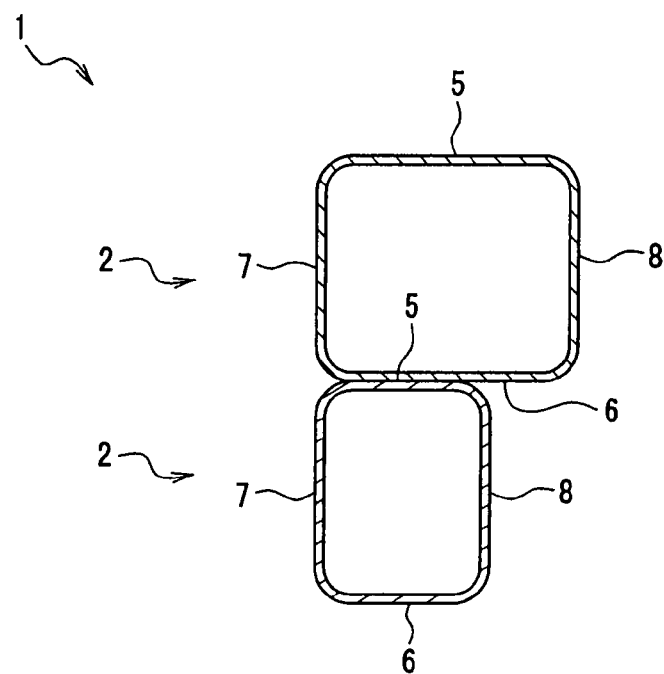
FIG. 31 is an enlarged end view along the J-J line in FIG. 30 of the same.

FIGS. 29-31 show an eleventh embodiment of the present invention. This embodiment differs from the fifth embodiment in that the positions of the rear surfaces 8, 8 of the upper tubular body 2 and the lower tubular body are not the same; however, in other respects the two embodiments are substantially the same. An explanation will be given primarily of the differences.

In the bumper beam 1, the front surface 7 of the upper tubular body 2 and the front surface 7 of the lower tubular body 2 are positioned at the same position in the front and rear directions, but the rear surface 8 of the upper tubular body 2 is positioned further rearward than the rear surface 8 of the lower tubular body 2 (see FIGS. 29 and 31).

In the embodiment shown in the drawings, while the vertical cross-section shape of the upper tubular body 2 has a rectangular shape that is long in the horizontal direction, the vertical cross-section shape of the lower tubular body 2 has a rectangular shape that is long in the vertical direction (see FIG. 31). The tubular bodies 2, 2 each are formed curved so as to project forward across the entire length in the longitudinal direction.

Figure 32:
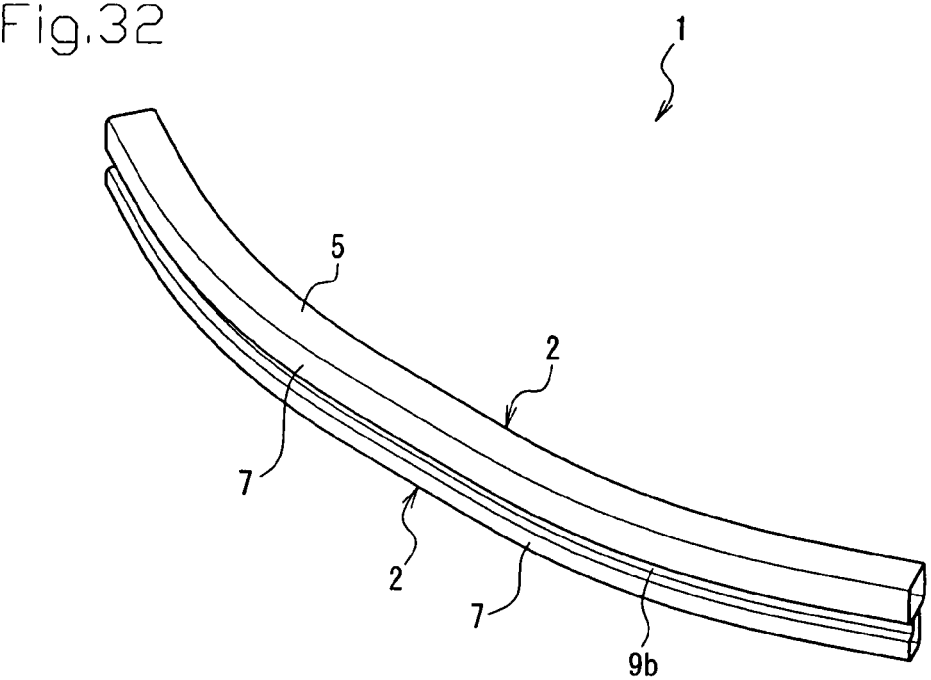
FIG. 32 is an oblique view of a twelfth embodiment of the present invention.
Figure 33:
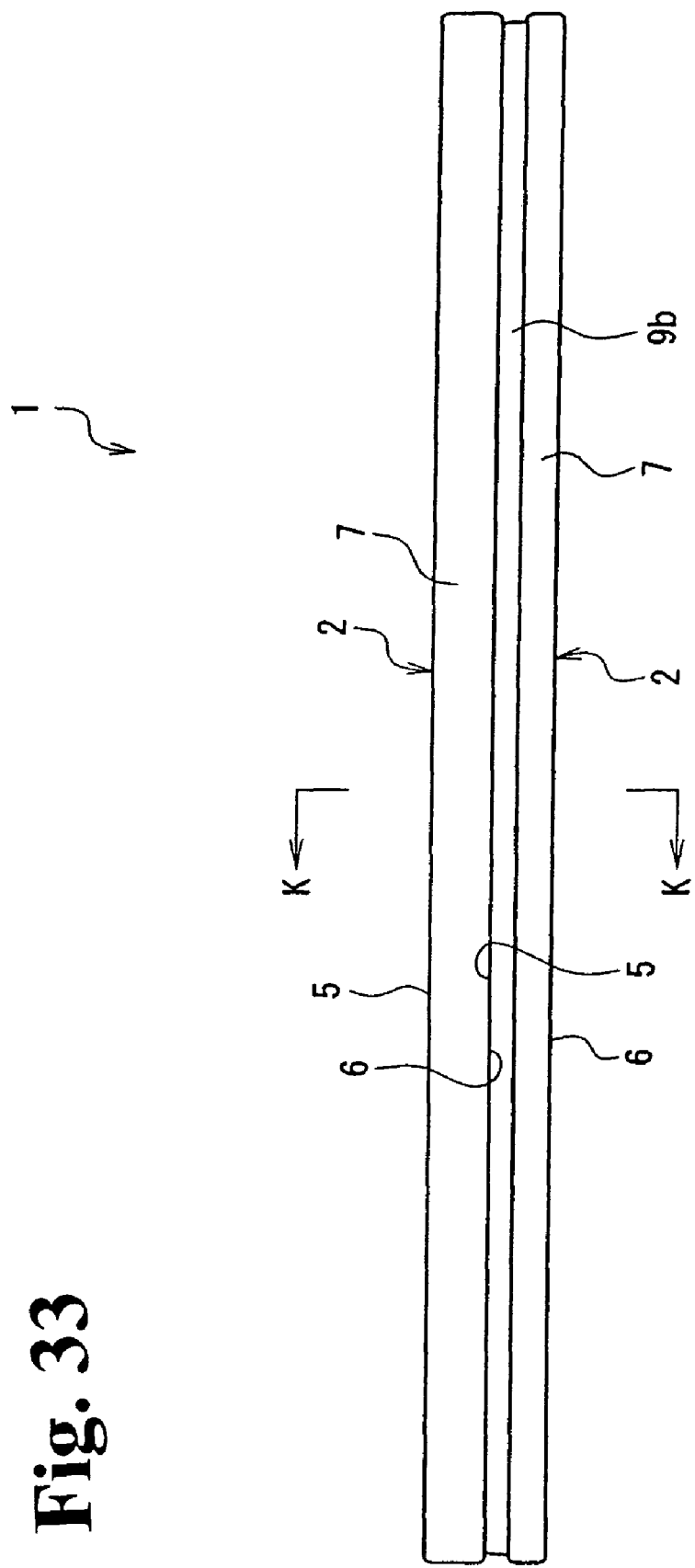
FIG. 33 is a front view of the same.
Figure 34:
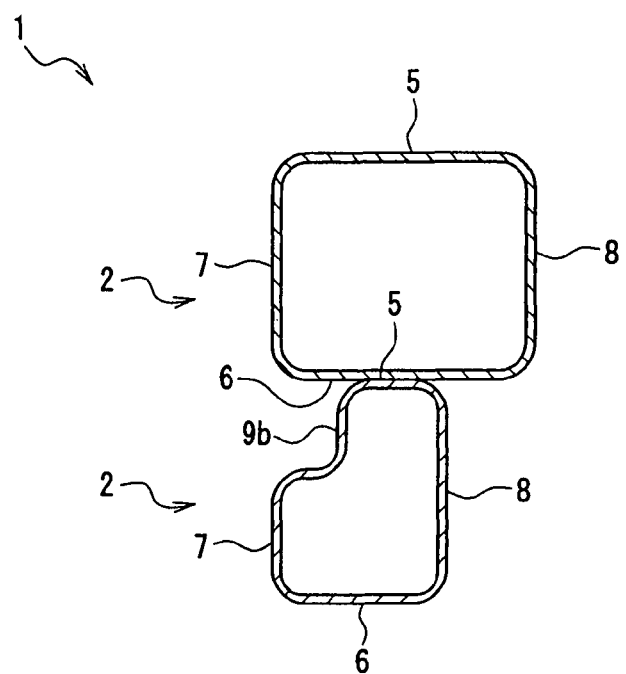
FIG. 34 is an enlarged end view along the K-K line in FIG. 33 of the same.

FIGS. 32-34 show a twelfth embodiment of the present invention. This embodiment differs from the eleventh embodiment in that a recess 9b is provided to the lower tubular body 2, but the two embodiments are substantially the same in other respects. More specifically, in this bumper beam 1, on the lower tubular body 2, the recess 9b is formed along the longitudinal direction extending the entire length of the upper section of the front surface.

Figure 35:
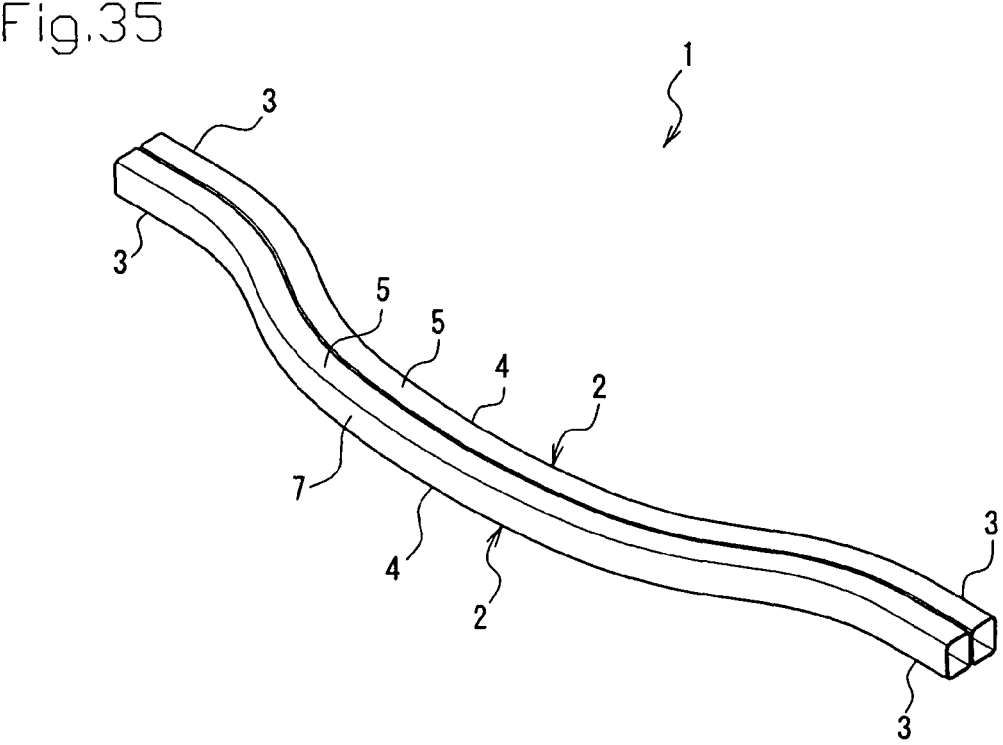
FIG. 35 is an oblique view of a thirteenth embodiment of the present invention.
Figure 36:
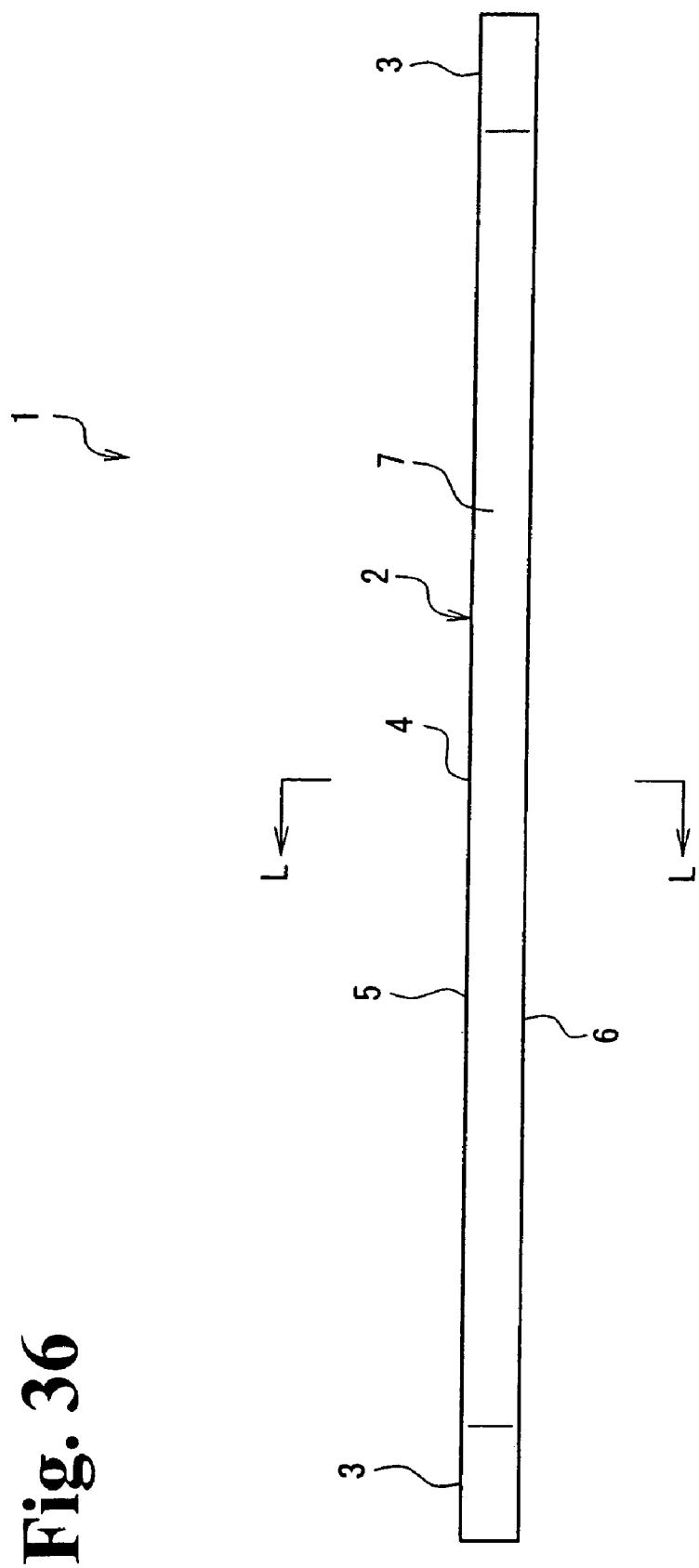
FIG. 36 is a front view of the same.
Figure 37:
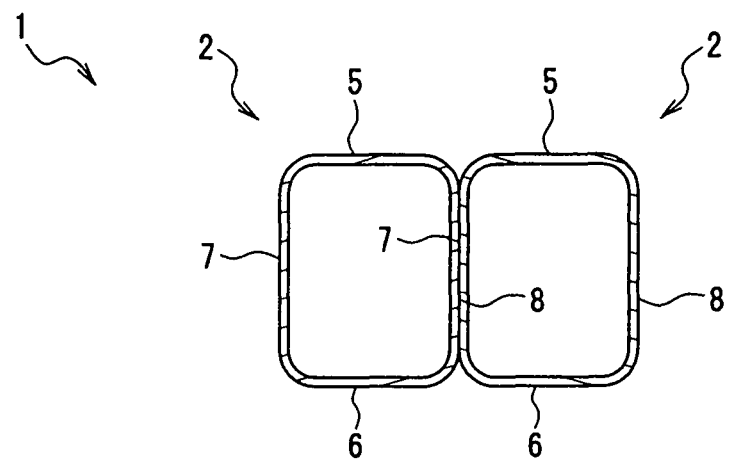
FIG. 37 is an enlarged end view along the L-L line in FIG. 36 of the same.

FIGS. 35-37 show a thirteenth embodiment of the present invention. This embodiment differs from the fifth embodiment in that the directions in which the tubular bodies 2, 2 are arrayed is different, but the two embodiments are substantially the same in other respects. More specifically, a plurality of tubular bodies 2, 2 constituting the bumper beam 1 (in the embodiment shown in the drawing, the two tubular bodies 2, 2) are disposed arrayed front to rear.

Specifically, the tubular bodies 2, 2 each are formed horizontally across the entire length in the longitudinal direction. More specifically, in the front tubular body 2 and the rear tubular body 2, the upper surface 5 and the lower surface 6 are formed horizontally across the entire length in the longitudinal direction. For each of the tubular bodies 2, 2, the two ends 3, 3 in the longitudinal direction extend substantially directly sideways, and the center section 4 excluding the two ends 3, 3 in the longitudinal direction is curved so as to project forward. The two tubular bodies 2, 2 are joined across the entire length in the longitudinal direction. More specifically, for the two tubular bodies 2, 2, the rear surface 8 of the front tubular body 2 and the front surface 7 of the rear tubular body 2, which face each other, are joined across the entire length in the longitudinal direction.

Figure 38:
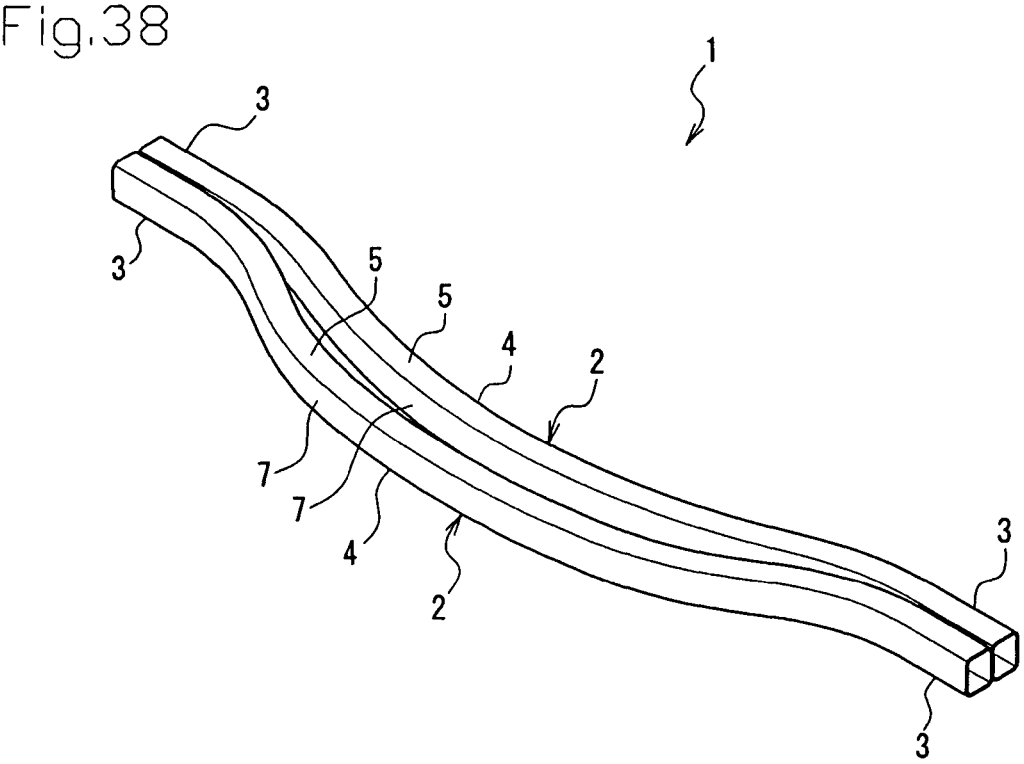
FIG. 38 is an oblique view of a fourteenth embodiment of the present invention.
Figure 39:
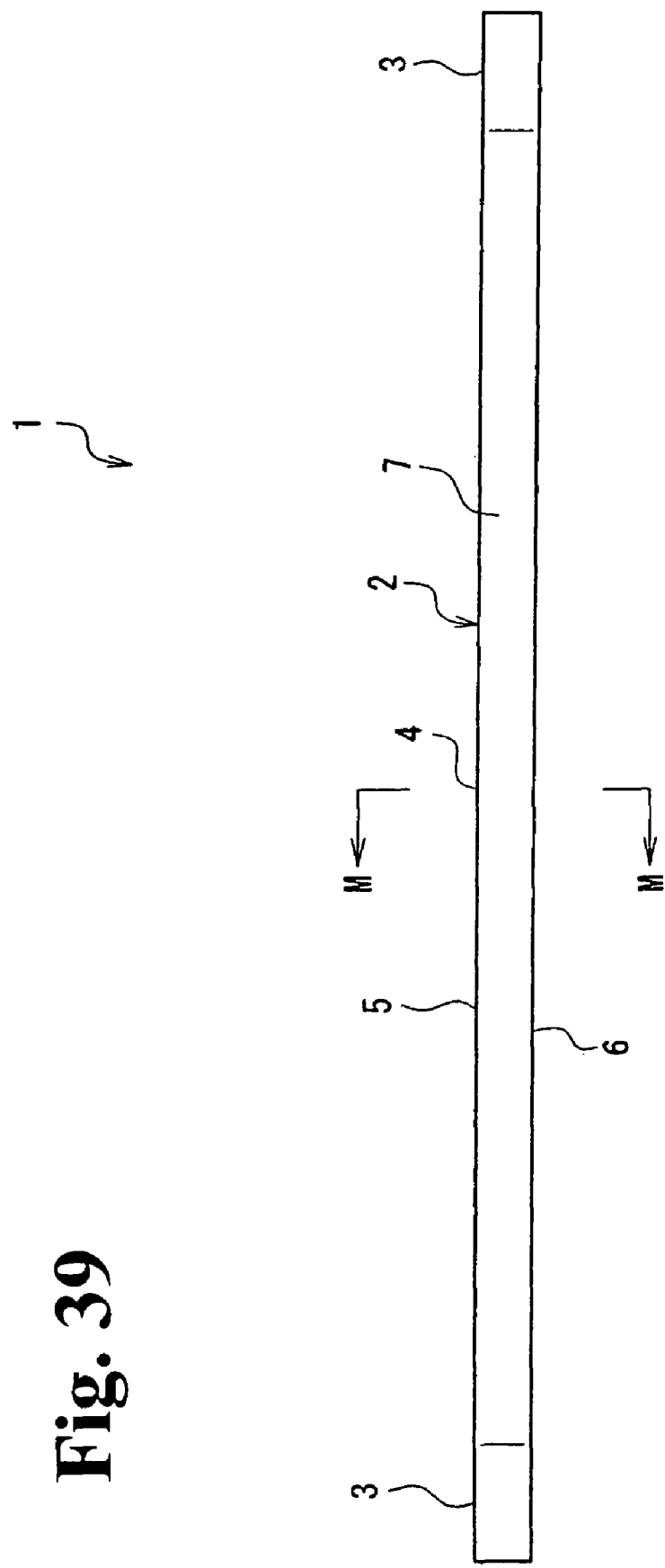
FIG. 39 is a front view of the same.
Figure 40:
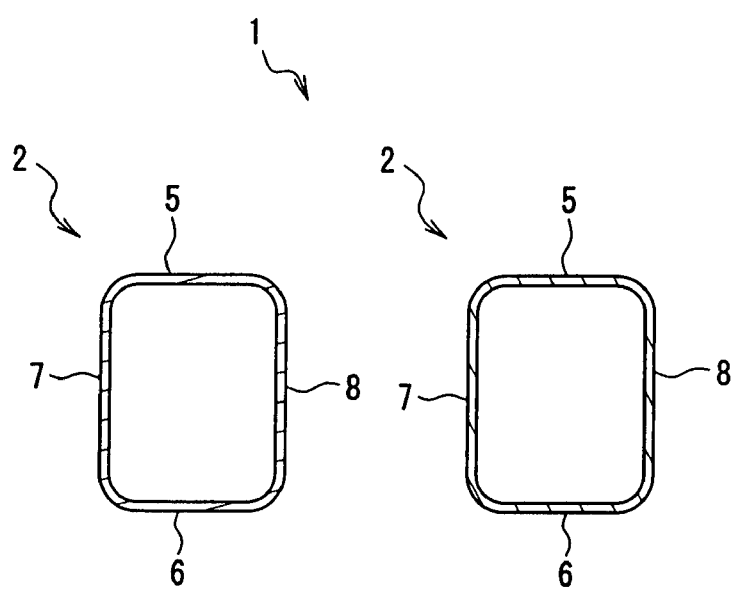
FIG. 40 is an enlarged end view along the M-M line in FIG. 39 of the same.
Figure 41:
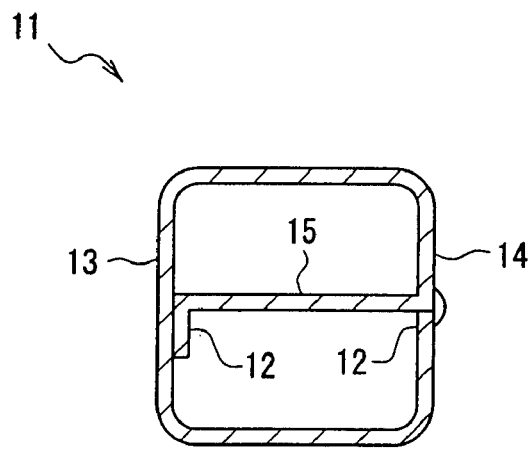
FIG. 41 is an enlarged view showing a vertical cross-section of a conventional bumper beam (patent document 1).
Figure 42:
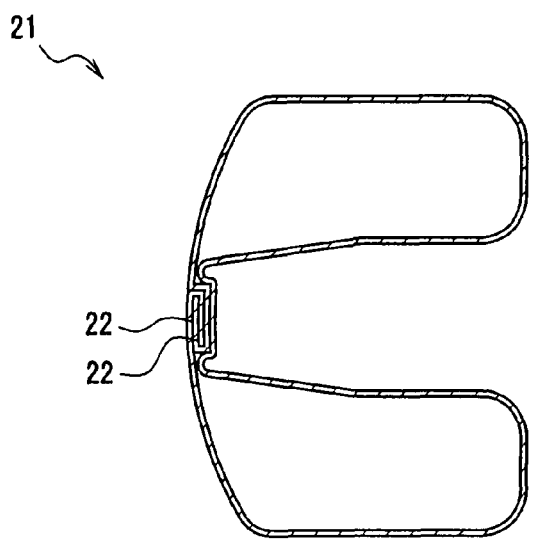
FIG. 42 is an enlarged view showing a vertical cross-section of another conventional bumper beam (patent document 2).
Figure 43:
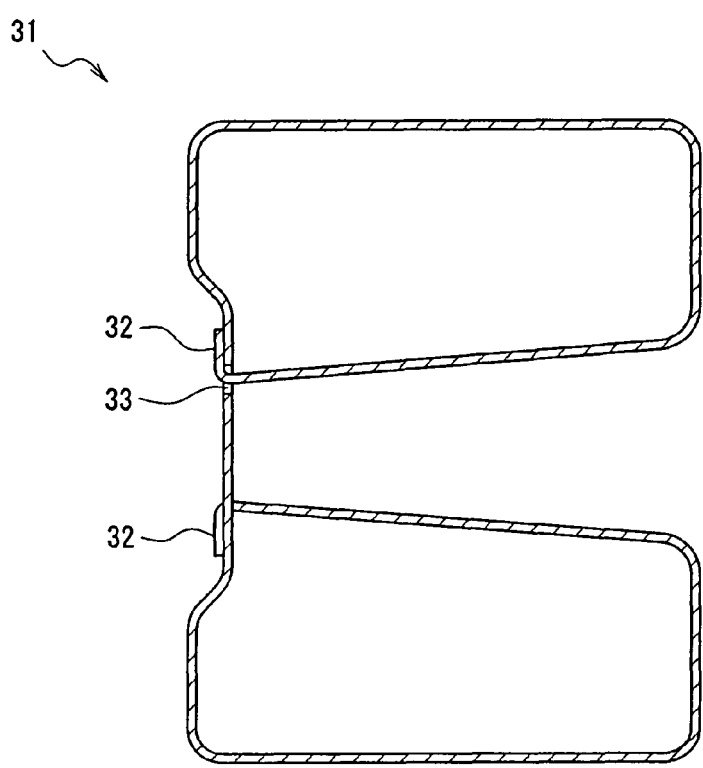
FIG. 43 is an enlarged view showing a vertical cross-section of another conventional bumper beam (patent document 3).
Figure 44:
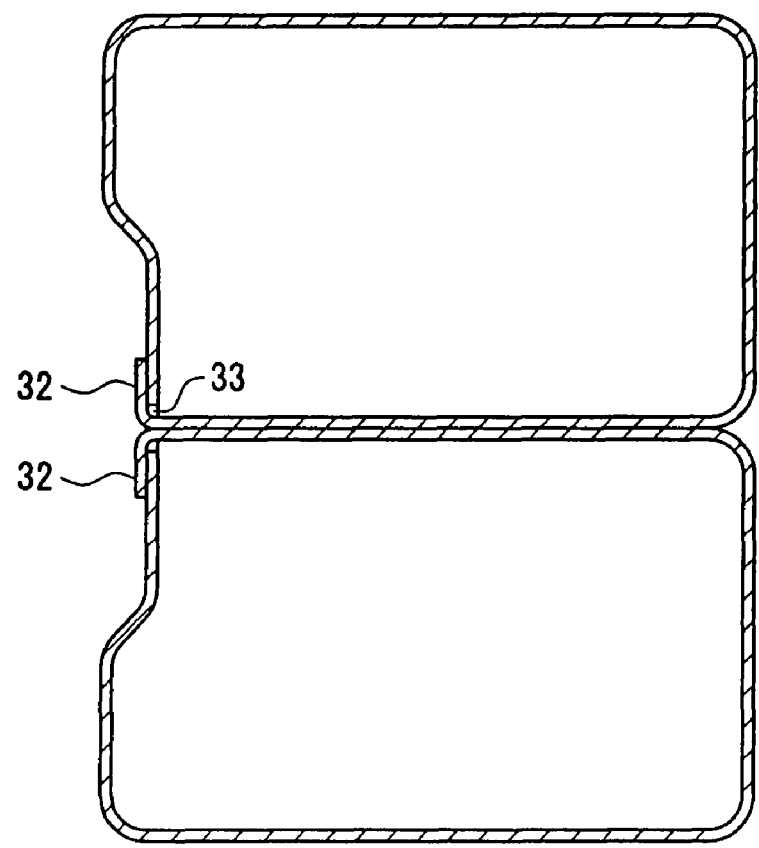
FIG. 44 is an enlarged view showing a vertical cross-section of another conventional bumper beam (patent document 3).
Figure 45:
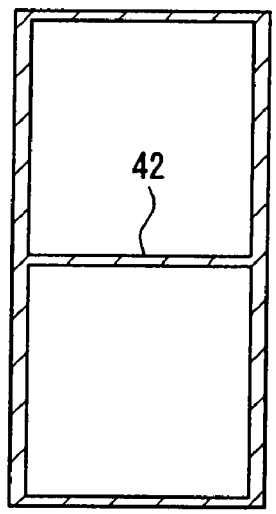
FIG. 45 is an enlarged view showing a vertical cross-section of another conventional bumper beam.
Figure 46:
FIG. 46 is a plan view of another conventional bumper beam (patent document 4).

FIGS. 38-40 show a fourteenth embodiment of the present invention. This embodiment differs from the thirteenth embodiment in that the two tubular bodies 2, 2 are joined partially in the longitudinal direction, but the two embodiments are substantially the same in other respects. An explanation will be given primarily of the differences.

For the two tubular bodies 2, 2 in the bumper beam 1, the two ends 3, 3 in the longitudinal direction are joined. In the front tubular body 2, the center section 4 excluding the two ends 3, 3 in the longitudinal direction is curved so as to project forward. In the rear tubular body 2, the center section 4 excluding the two ends 3, 3 in the longitudinal direction is formed curved so as to project forward to an extent less than the extent to which the front tubular body projects. Thus, in the front tubular body 2 and the rear tubular body 2, the center sections 4, 4 excluding the two ends 3, 3 in the longitudinal direction (i.e., the rear surface 8 of the front tubular body 2 and the front surface 7 of the rear tubular body 2) are separated from each other.

Next, the operational effects of the bumper beam 1 shown in embodiments 1-14 will be explained. In accordance with this bumper beam 1, because the two tubular bodies 2, 2 constituting the bumper beam 1 are formed by tube hydroforming, the vertical cross-section shape can be changed in the longitudinal direction, and the curvature of the line of the front surface 7 or the rear surface 8 as seen in a plan view or the curvature of the line of the upper surface 5 or the lower surface 6 as seen in a front view can be changed in the longitudinal direction, and thus there is a high degree of freedom with respect to shape. Therefore, this bumper beam 1 can be easily formed along the body lines of various types of automobiles, and easily made into a shape suitable for protecting such automobiles from collisions in accordance with the specifications of the various types of automobiles. Further, the bumper beam 1 comprises a plurality of tubular bodies 2, 2 (in the embodiments in the drawings, the two tubular bodies 2, 2) joined together in a parallel state, and thus because of these tubular bodies 2, 2, the bumper beam 1 has a plurality of loops in its vertical cross-section (the embodiments in the drawings have two loops). Thus, because the bumper beam 1 has a plurality of loops in its vertical cross-section (two loops in the embodiments in the drawings), the constitution is advantageous in terms of strength, and the bumper beam can be made smaller (more specifically, the depth, i.e., the front-to-rear dimension, can be made smaller) and there can be leeway in terms of space on the body side of the automobile. More specifically, in accordance with the bumper beam 1, by joining the tubular bodies 2, 2 formed by tube hydroforming together in a parallel state, the bumper beam 1 can be made smaller while retaining a high degree of freedom with respect to shape.

Here, particularly in the embodiments other than the third and fourteenth embodiments, the tubular bodies 2, 2 constituting the bumper beam 1 are joined across the entire length in the longitudinal direction. Thus, because tubular bodies 2, 2 are joined across the entire length in the longitudinal direction, the bumper beam can be given greater rigidity.

Because plurality of tubular bodies 2 (in the embodiments in the drawings, two such bodies) are used, the vertical cross-section shape of these tubular bodies 2, 2 can be changed, the plate thickness can be changed and the materials can be changed, and a vertical cross-section shape, plate thickness or materials appropriate to the disposition position of each tubular body 2 in the bumper beam 1 can be selected. In this way, a bumper beam 1 with nothing extraneous can be made, meaning that a lighter bumper beam 1 can be achieved. Regarding the vertical cross-section shape, in the seventh through twelfth embodiments, for example, the vertical cross-section shape of each of the two tubular bodies is different across the entire length in the longitudinal direction. And in the second embodiment, in the center sections 4, 4 in the longitudinal direction, the two tubular bodies 2, 2 have different vertical cross-section shapes. With respect to plate thickness, in the sixth and tenth embodiments, for example, the two tubular bodies 2, 2 have different plate thicknesses. High-tensile steel is used as the material of the tubular bodies in the above embodiments, but ordinary steel, aluminum or an aluminum alloy may also be used. For example, even among high-tensile steel, materials having a tensile strength of 780 MPa or 980 MPa and so on are available, and these materials may be selected and used as appropriate. In the plurality of tubular bodies 2, 2 constituting the bumper beam 1 (in the embodiments in the drawings, the two tubular bodies 2, 2), all of the tubular bodies 2, 2 may be entirely made of the same materials or at least two tubular bodies from among the plurality of tubular bodies 2, 2 may be made using different materials from each other.

In the bumper beam 1 shown in the third embodiment, the upper tubular body 2 and the lower tubular body 2 are separated from each other at the center sections 4, 4 in the longitudinal direction. Thus, the vertical cross-section shape of the tubular bodies 2, 2 can be made smaller, and a lighter bumper beam 1 can be achieved.

In the bumper beam 1 shown in the first through fourth embodiments, for the upper tubular body 2, in the center section 4 excluding the two ends 3, 3 in the longitudinal direction, the upper surface 5 is formed projecting upward, or for the lower tubular body 2, in the center section 4 excluding the two ends 3, 3 in the longitudinal direction, the lower surface 6 is formed projecting downward. In this way, because the upper surface 5 at the center section 4 of the upper tubular body 2 projects upward, the bumper beam 1 can handle an impact at an upward position, with the two ends 3, 3 in the longitudinal direction as is. And because the lower surface 6 at the center section 4 of the lower tubular body 2 projects downward, the bumper beam 1 can handle an impact at a downward position, with the two ends 3, 3 in the longitudinal direction as is.

As with the bumper beam 1 shown in the first, eighth through tenth, and twelfth embodiments, by providing the tubular body 2 with the recesses 9a, 9b along the longitudinal direction, the rigidity of the bumper beam 1 can be increased. And in these embodiments, the recess 9a in the upper tubular body 2 is provided at the lower section of the front surface of the tubular body 2, and the recess 9b in the lower tubular body 2 is provided at the upper section of the front surface of the tubular body 2. Therefore, because of these recesses 9a, 9b, height with respect to impact can be maintained, without reducing top to bottom height of the front surface 7 of the bumper beam 1.

This invention is not limited to the embodiments described above; various other modifications may be made. For example, the bumper beam 1 may comprise three or more tubular bodies 2, 2 instead of two tubular bodies 2, 2. Alternatively, a plurality of tubular bodies 2, 2 constituting the bumper beam 1 may all be disposed arrayed vertically, or all disposed arrayed front to rear, or may be disposed lined up both vertically and from front to rear.

The vertical cross-section shape of the tubular body 2 may be trapezoidal or some other shape than rectangular.

The tubular bodies 2, 2 constituting the bumper beam 1 is arrayed so that the ends in the longitudinal direction line up; however, the ends may be made to not line up by changing the length of the tubular body 2.

The various elements in the bumper beams 1 shown in the embodiments described above may of course be assembled as appropriate to form a new bumper beam 1. For example, the bumper beam 1 shown in the thirteenth and fourteenth embodiments may be made so that the front tubular body 2 and the rear tubular body 2 are made from different materials or have different plate thicknesses. Thus impact absorption efficiency of the bumper beam 1 in an automobile impact can be increased.

The invention claimed is:

1. A bumper beam for an automobile comprising two tubular bodies that extend in a longitudinal direction, the two tubular bodies being vertically arrayed as a top tubular body and a bottom tubular body, the two tubular bodies each having a first end section, a second end section, and a center section, the top tubular body extending horizontally in a plane in each of the first end section and the second end section and having an upward projection on an upper surface of the top tubular body in the center section and an upward depression on a lower surface of the top tubular body in the center section, the bottom tubular body extending horizontally in a plane in each of the first end section and the second end section, and having an upward projection on an upper surface of the bottom tubular body in the center section, the upward projection on the upper surface of the bottom tubular body having a projection profile that complements the depression profile of the upward depression on the lower surface of the top tubular body, whereby a contacting surface in the center section of the top and bottom tubular bodies is provided for and at which the top and bottom tubular bodies are joined, the top and bottom tubular bodies being joined together at the first and second end sections.

2. The bumper beam for an automobile of claim 1, wherein the two tubular bodies have a substantially rectangular shape in cross-section.

3. The bumper beam for an automobile of claim 1, wherein the top tubular body and the bottom tubular body are joined entirely across the longitudinal direction.

4. The bumper beam for an automobile of claim 1, wherein the two tubular bodies have walls formed of different thicknesses.

5. The bumper beam for an automobile of claim 1, wherein the two tubular bodies are formed by tube hydroforming.

6. The bumper beam for an automobile of claim 1, wherein a front surface of the top tubular body and a front surface of the bottom tubular body are in a vertical plane, and a rear surface of the top tubular body and a rear surface of the bottom tubular body are in a vertical plane.

7. The bumper beam for an automobile of claim 1, wherein a front surface of the top tubular body and a front surface of the bottom tubular body are in a vertical plane, and a rear surface of the top tubular body extends further in a rearward direction than a rear surface of the bottom tubular body.

8. The bumper beam for an automobile of claim 1, wherein the center sections of the two tubular bodies have a curved forward projection that extends forward relative to the first and second end sections of the two tubular bodies.

9. The bumper beam for an automobile of claim 1, wherein the bottom tubular body has a lower surface extending horizontally, in each of the first end section, the second end section, and the center section.

10. The bumper beam for an automobile of claim 1, wherein:
- the upper surface of the top tubular body in each of the first end section and the second end section of the top tubular body being aligned generally with an upper plane;
- the lower surface of the top tubular body in each of the first end section and the second end section of the top tubular body being aligned generally with a lower plane; and
- the upward depression on the lower surface of the top tubular body has a depression profile that extends less upward relative to the lower plane than a projection profile of the upward projection on the upper surface of the top tubular body relative to the upper plane.

11. The bumper beam for an automobile of claim 1, wherein the top tubular body has a recess extending in the longitudinal direction that is formed in a lower portion of a front surface of the top tubular body, and the bottom tubular body has a recess extending in the longitudinal direction that is formed in an upper portion of a front surface of the bottom tubular body.

12. The bumper beam for an automobile of claim 1, wherein the top tubular body has a recess extending in the longitudinal direction that is formed in a lower portion of a front surface of the top tubular body.

13. The bumper beam for an automobile of claim 1, wherein the bottom tubular body has a recess extending in the longitudinal direction that is formed in an upper portion of a front surface of the bottom tubular body.

* * * * *